United States Patent
Peng et al.

(10) Patent No.: US 11,467,332 B2
(45) Date of Patent: Oct. 11, 2022

(54) DISPLAY WITH SWITCHABLE RETARDER ARRAY

(71) Applicant: META PLATFORMS TECHNOLOGIES, LLC, Menlo Park, CA (US)

(72) Inventors: Fenglin Peng, Redmond, WA (US); Ying Geng, Bellevue, WA (US); Jacques Gollier, Sammamish, WA (US); Garam Young, Sunnyvale, CA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 355 days.

(21) Appl. No.: 16/734,167

(22) Filed: Jan. 3, 2020

(65) Prior Publication Data

US 2021/0072453 A1 Mar. 11, 2021

Related U.S. Application Data

(60) Provisional application No. 62/898,511, filed on Sep. 10, 2019.

(51) Int. Cl.
*G02B 6/00* (2006.01)
*F21V 8/00* (2006.01)
(Continued)

(52) U.S. Cl.
CPC .......... *G02B 6/0056* (2013.01); *G02B 6/005* (2013.01); *G02B 6/0055* (2013.01);
(Continued)

(58) Field of Classification Search
CPC .... A61M 2005/2013; A61M 2005/202; A61M 2005/2086; A61M 2005/3143;
(Continued)

(56) References Cited

U.S. PATENT DOCUMENTS 5,797,668 A 8/1998 Kojima et al.
6,075,651 A 6/2000 Hoppe
(Continued)

FOREIGN PATENT DOCUMENTS

EP 1358765 A1 11/2003
FR 2690534 A1 10/1993
(Continued)

OTHER PUBLICATIONS

Facebook Technologies, LLC, Invitation to Pay Additional Fees, PCT/US2020/033688, Sep. 8, 2020, 16 pgs.
(Continued)

*Primary Examiner* — Joseph P Martinez
*Assistant Examiner* — Vipin Patel
(74) *Attorney, Agent, or Firm* — Morgan, Lewis & Bockius LLP

(57) ABSTRACT

A display device includes a waveguide, an array of tunable retarders in contact with the waveguide, and a polarization selective optical element. A respective tunable retarder of the array of tunable retarders receives light from the waveguide. The respective tunable retarder has a first state, which causes the respective tunable retarder to direct light having a first polarization in a first direction and a second state, which causes the respective tunable retarder to direct light having a second polarization that is distinct from the second polarization in the first direction. The polarization selective optical element is located adjacent to the array of tunable retarders so that the light having the second polarization propagates from the polarization selective optical element in a second direction and the light having the second polarization propagates from the polarization selective optical element in a third direction distinct from the second direction.

20 Claims, 14 Drawing Sheets

(51) Int. Cl.
*G02F 1/01* (2006.01)
*G02B 27/01* (2006.01)
*G02B 27/28* (2006.01)
*G02F 1/139* (2006.01)

(52) U.S. Cl.
CPC ....... *G02B 27/0172* (2013.01); *G02B 27/283* (2013.01); *G02F 1/0136* (2013.01); *G02F 1/1393* (2013.01); *G02B 2027/0178* (2013.01)

(58) Field of Classification Search
CPC .. A61M 2005/3152; A61M 2005/3247; A61M 2005/3267; A61M 2205/3341; A61M 2205/581; A61M 2205/582; A61M 2207/00; A61M 5/1454; A61M 5/20; A61M 5/2033; A61M 5/3157; A61M 5/31581; A61M 5/31583; A61M 5/31585; A61M 5/31586; A61M 5/3159; A61M 5/3204; A61M 5/326; A61M 5/46; A61M 5/484; G02B 2027/0138; G02B 2027/014; G02B 2027/0178; G02B 27/0093; G02B 27/0172; G02B 27/283; G02B 6/005; G02B 6/0055; G02B 6/0056; G02F 1/0136; G02F 1/133601; G02F 1/133615; G02F 1/13362; G02F 1/133638; G02F 1/134363; G02F 1/13471; G02F 1/1393; G02F 2201/30; G02F 2203/62
See application file for complete search history.

(56) References Cited

U.S. PATENT DOCUMENTS

| | | |
|---|---|---|
| 6,094,242 A | 7/2000 | Yamanaka |
| 6,104,454 A | 8/2000 | Hiyama et al. |
| 6,373,603 B1 | 4/2002 | Popovich et al. |
| 6,563,638 B2 | 5/2003 | King et al. |
| 6,829,095 B2 | 12/2004 | Amitai |
| 7,175,332 B2 | 2/2007 | Tang |
| 7,573,640 B2 | 8/2009 | Nivon et al. |
| 7,946,708 B2 | 5/2011 | Sakata et al. |
| 7,976,208 B2 | 7/2011 | Travis et al. |
| 8,079,718 B1 | 12/2011 | Zhai et al. |
| 8,305,690 B2 | 11/2012 | Ruhle et al. |
| 8,570,656 B1 | 10/2013 | Weissman |
| 8,698,713 B2 | 4/2014 | Hajjar et al. |
| 8,724,206 B2 | 5/2014 | Spitzer et al. |
| 8,941,559 B2 | 1/2015 | Bar-Zeev et al. |
| 8,964,298 B2 | 2/2015 | Haddick et al. |
| 9,087,471 B2 | 7/2015 | Miao |
| 9,225,971 B2 | 12/2015 | Woodgate et al. |
| 9,251,745 B2 | 2/2016 | Sprague |
| 9,507,066 B2 | 11/2016 | Kollin et al. |
| 9,519,084 B1 | 12/2016 | Thomas |
| 9,557,568 B1 | 1/2017 | Ouderkirk et al. |
| 10,095,036 B2 | 10/2018 | Carollo et al. |
| 10,241,330 B2 | 3/2019 | Popovich et al. |
| 10,274,805 B2 | 4/2019 | Tabirian et al. |
| 10,353,210 B2 | 7/2019 | Wyrwas et al. |
| 10,429,647 B2 | 10/2019 | Gollier et al. |
| 10,495,798 B1 | 12/2019 | Peng et al. |
| 10,578,873 B2 | 3/2020 | Lee et al. |
| 10,634,907 B1 | 4/2020 | Geng et al. |
| 10,663,745 B2 | 5/2020 | Ouderkirk et al. |
| 10,976,551 B2 | 4/2021 | Cobb |
| 10,996,466 B2 | 5/2021 | Amirsolaimani et al. |
| 11,002,970 B2 | 5/2021 | Martinez et al. |
| 11,022,803 B2 | 6/2021 | Lee |
| 11,054,648 B2 | 7/2021 | Carollo et al. |
| 11,067,810 B2 | 7/2021 | Yonekubo et al. |
| 11,086,127 B2 | 8/2021 | Nishiyama et al. |
| 11,269,123 B2 | 3/2022 | Sharp et al. |
| 2004/0108971 A1 | 6/2004 | Waldern et al. |
| 2004/0109208 A1 | 6/2004 | Amanai et al. |
| 2005/0123229 A1 | 6/2005 | Huck et al. |
| 2006/0221448 A1 | 10/2006 | Nivon et al. |
| 2010/0053121 A1 | 3/2010 | Sprague |
| 2010/0103078 A1 | 4/2010 | Mukawa et al. |
| 2011/0043142 A1 | 2/2011 | Travis et al. |
| 2011/0096100 A1 | 4/2011 | Sprague |
| 2011/0187293 A1 | 8/2011 | Travis |
| 2012/0069031 A1 | 3/2012 | Bita et al. |
| 2013/0101253 A1 | 4/2013 | Popovich et al. |
| 2013/0201094 A1 | 8/2013 | Travis et al. |
| 2013/0314793 A1 | 11/2013 | Robbins et al. |
| 2014/0160543 A1 | 6/2014 | Putilin et al. |
| 2014/0168034 A1 | 6/2014 | Luebke et al. |
| 2014/0267875 A1 | 9/2014 | Gruhlke et al. |
| 2014/0268879 A1 | 9/2014 | Mizuyama et al. |
| 2015/0235460 A1 | 8/2015 | Schowengerdt et al. |
| 2015/0378074 A1 | 12/2015 | Kollin et al. |
| 2016/0026253 A1 | 1/2016 | Bradski et al. |
| 2016/0033698 A1 | 2/2016 | Escuti et al. |
| 2016/0363777 A1 | 12/2016 | Flynn et al. |
| 2017/0016594 A1 | 1/2017 | Di Trapani et al. |
| 2017/0068102 A1 | 3/2017 | Wong et al. |
| 2017/0153454 A1 | 6/2017 | Callier et al. |
| 2017/0255015 A1 | 9/2017 | Geng et al. |
| 2017/0285347 A1 | 10/2017 | Cai |
| 2017/0293148 A1 | 10/2017 | Park et al. |
| 2017/0336552 A1 | 11/2017 | Masuda et al. |
| 2018/0029319 A1 | 2/2018 | Kalima et al. |
| 2018/0088325 A1 | 3/2018 | Brown et al. |
| 2018/0107007 A1 | 4/2018 | Wyrwas et al. |
| 2018/0172988 A1 | 6/2018 | Ahmed et al. |
| 2018/0180788 A1 | 6/2018 | Ambur et al. |
| 2018/0239147 A1 | 8/2018 | Schowengerdt et al. |
| 2018/0267222 A1 | 9/2018 | Ambur et al. |
| 2018/0335629 A1 | 11/2018 | Cheng et al. |
| 2018/0364482 A1 | 12/2018 | Georgiou et al. |
| 2019/0018245 A1 | 1/2019 | Cheng et al. |
| 2019/0018480 A1 | 1/2019 | Aleem et al. |
| 2019/0018481 A1 | 1/2019 | Aleem et al. |
| 2019/0025602 A1 | 1/2019 | Qin et al. |
| 2019/0041642 A1 | 2/2019 | Haddick et al. |
| 2019/0060602 A1 | 2/2019 | Tran et al. |
| 2019/0072767 A1 | 3/2019 | Vallius et al. |
| 2019/0094549 A1 | 3/2019 | Nicholson et al. |
| 2019/0212573 A1 | 7/2019 | Popovich et al. |
| 2019/0235235 A1 | 8/2019 | Ouderkirk et al. |
| 2019/0265477 A1 | 8/2019 | Perreault et al. |
| 2019/0353906 A1 | 11/2019 | Gollier et al. |
| 2019/0369403 A1 | 12/2019 | Leister |
| 2020/0050008 A1 | 2/2020 | Seo et al. |
| 2020/0089002 A1 | 3/2020 | Lee |
| 2020/0096816 A1 | 3/2020 | Lee et al. |
| 2020/0124858 A1 | 4/2020 | Cakmakci |
| 2020/0133005 A1 | 4/2020 | Yonekubo et al. |
| 2020/0133017 A1 | 4/2020 | Ide |
| 2020/0209667 A1 | 7/2020 | Sharlin et al. |
| 2020/0249480 A1 | 8/2020 | Martinez et al. |
| 2020/0310024 A1 | 10/2020 | Danziger et al. |
| 2020/0310537 A1 | 10/2020 | Simmons |
| 2020/0348530 A1 | 11/2020 | Xiao et al. |
| 2020/0371280 A1 | 11/2020 | Geng et al. |
| 2020/0371387 A1 | 11/2020 | Gollier et al. |
| 2020/0371388 A1 | 11/2020 | Geng et al. |
| 2020/0371389 A1 | 11/2020 | Geng et al. |
| 2020/0379226 A1 | 12/2020 | Steiner et al. |
| 2021/0072551 A1 | 3/2021 | Gollier et al. |
| 2021/0080726 A1 | 3/2021 | Geng et al. |
| 2021/0271082 A1 | 9/2021 | Smith et al. |
| 2021/0278679 A1 | 9/2021 | Ouderkirk et al. |
| 2021/0286183 A1 | 9/2021 | Ouderkirk et al. |
| 2021/0294012 A1 | 9/2021 | Wong et al. |

FOREIGN PATENT DOCUMENTS

| | | |
|---|---|---|
| GB | 2384059 A | 7/2003 |
| WO | WO2007/062098 A2 | 5/2007 |
| WO | 2018146326 A2 | 8/2018 |
| WO | 2018175649 A1 | 9/2018 |

(56) References Cited

FOREIGN PATENT DOCUMENTS

| WO | WO2018/175653 A1 | 9/2018 |
|---|---|---|
| WO | 2018221867 A1 | 12/2018 |
| WO | 2019104046 A1 | 5/2019 |

OTHER PUBLICATIONS

Large M J et al., "Parallel Optics in Waveguide Displays: A Flat Panel Autostereoscopic Display," Journal of Display Technology, IEEE Service Center, New York NY, US, vol. 6, No. 10, Oct. 1, 2010 pp. 431-437, XP011311965.

Moller C et al., "Flat Panel Time Multiplexed Autostereoscopic Display Using an Optical WedgeA Waveguide," IDW, 3D2-1, London UK, Jan. 1, 2004, pp. 1443-1446, XP007013996.

Aye T.M., et al., "Compact HMD Optics Based on Multiplexed Aberration-Compensated Holographic Optical Elements," Proceedings of SPIE, Event: Aerospace/Defense Sensing, Simulation, and Controls, Orlando, FL, Aug. 22, 2001, vol. 4361, pp. 88-97.

Arussa J.A., et al., "The Holographic Pancake Window," Proceedings of SPIE 1978, Event: 22nd Annual Technical Symposium, San Diego, 1978, 11 pages.

Margarinos., et al., "Wide Angle, Color, Hologrpahic Infinity Optics Display-Final Report," Farrand Optical Co., Valhalla, NY, Rort No. AFHRL-TR-80-53, Mar. 1981, 93 pages, retrieved from internet: URL: https://files.eric.ed.gov/fulltext/ED202467.pdf.

Moon S., et al., "Layered Display with Accommodation Cue Using Scattering Polarizers," IEEE Journal of Selected Topics in Signal Processing, IEEE, US, Oct. 23, 2017, vol. 11 (7), pp. 1223-1231.

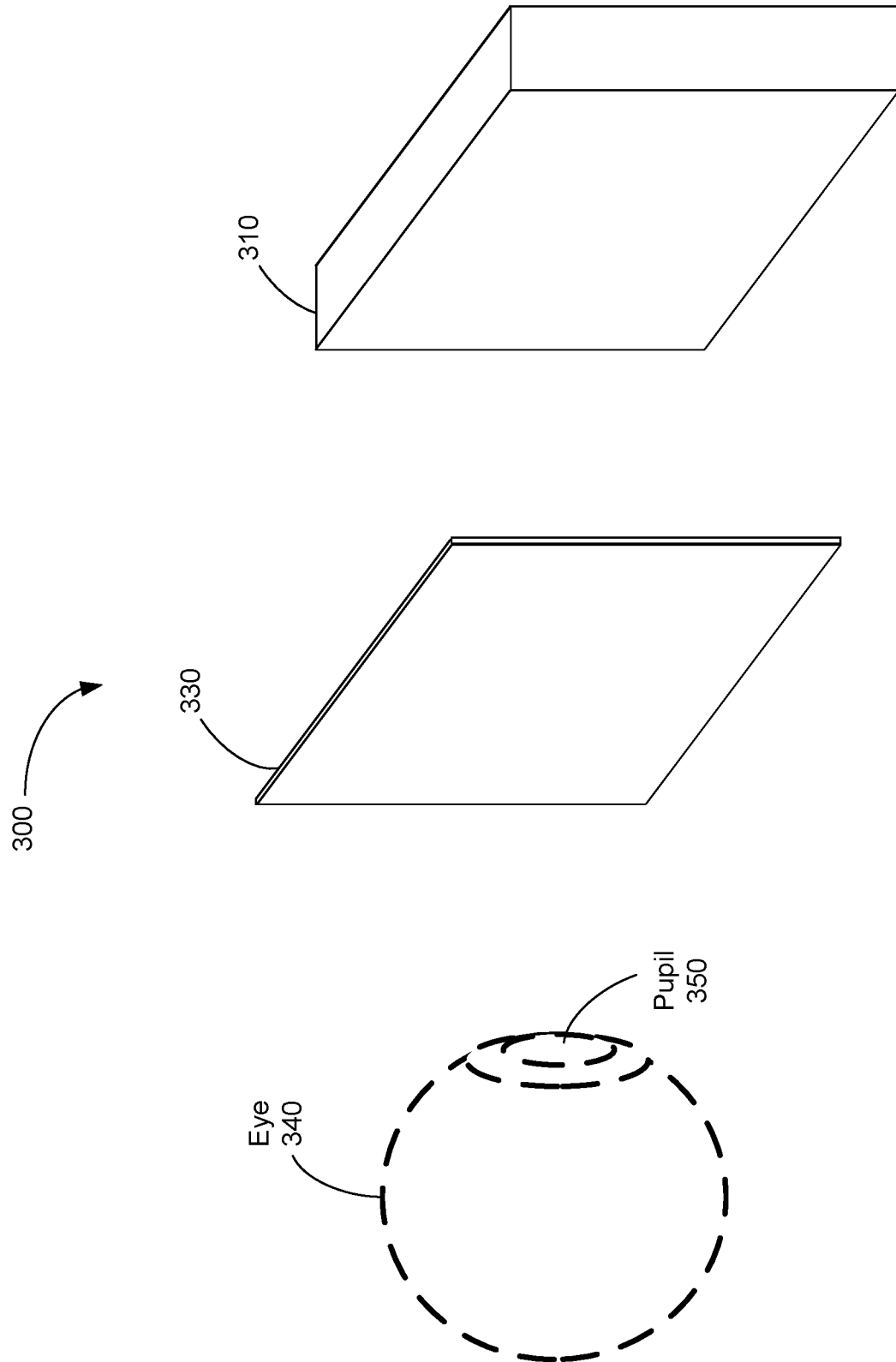

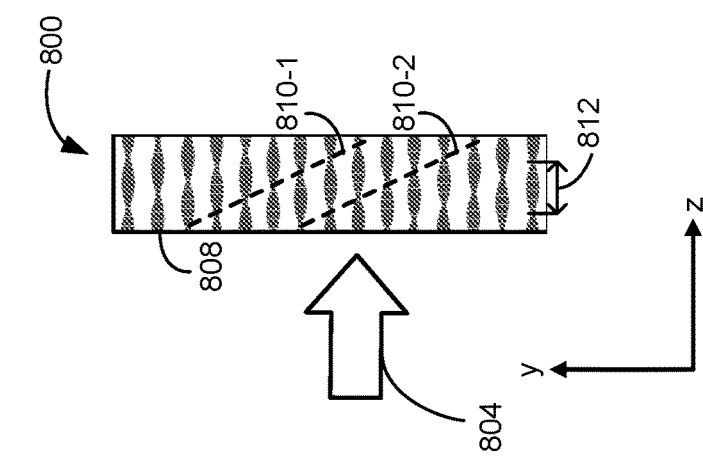
Figure 8C
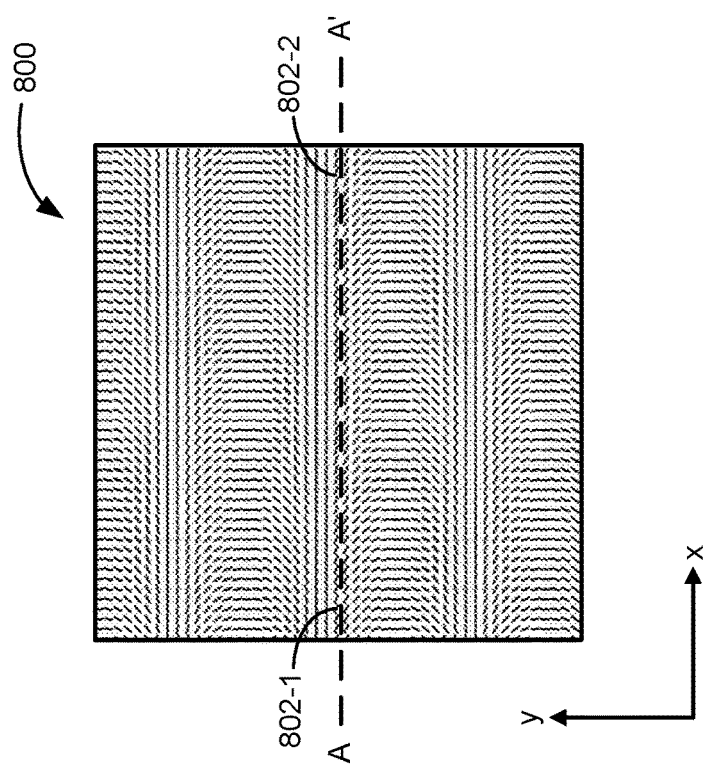
Figure 8B
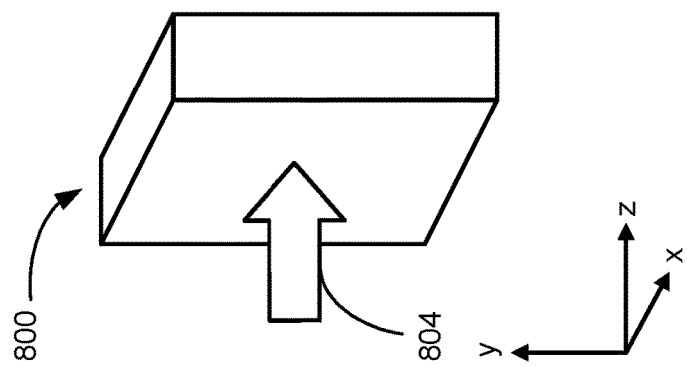
Figure 8A
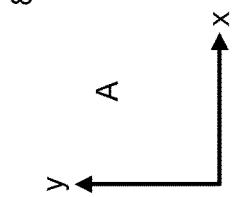
Figure 8D

DISPLAY WITH SWITCHABLE RETARDER ARRAY

RELATED APPLICATIONS

This application claims the benefit of, and priority to, U.S. Provisional Patent Application Ser. No. 62/898,511, filed Sep. 10, 2019, which is incorporated by reference herein in its entirety. This application is related to U.S. patent application Ser. No. 16/734,163, entitled "Switchable Polarization Retarder Array for Active Zonal Illumination of Display" filed Jan. 3, 2020, which is incorporated by reference herein in its entirety.

TECHNICAL FIELD

This relates generally to display devices, and more specifically to head-mounted display devices.

BACKGROUND

Head-mounted display devices (also called herein head-mounted displays) are gaining popularity as means for providing visual information to a user. For example, the head-mounted display devices are used for virtual reality and augmented reality operations.

There is a need for head-mounted display devices with a high resolution for enhancing user experience with virtual reality and/or augmented reality operations. Reflective spatial light modulator (SLM) displays, such as liquid crystal on silicon (LCoS) displays, are desirable for head-mounted display devices because they provide high brightness and high efficiency, and are suitable for small sized displays (e.g., microdisplays).

Therefore, there is a need for efficient, compact, and light-weighted SLM displays applicable for head-mounted display devices.

SUMMARY

In accordance with some embodiments, an optical device for illuminating one or more portions of a spatial light modulator includes a waveguide, an array of tunable retarders, and a polarization selective optical element. The array of tunable retarders is positioned relative to the waveguide so that a respective tunable retarder of the array of tunable retarders receives light from the waveguide. The respective tunable retarder has a first state, which causes the respective tunable retarder to direct light having a first polarization in a first direction, and a second state, distinct from the first state, which causes the respective tunable retarder to direct light having a second polarization in the first direction. The second polarization is distinct from the first polarization. The polarization selective optical element is located adjacent to the array of tunable retarders so that the light having the first polarization propagates from the polarization selective optical element in a second direction and the light having the second polarization propagates from the polarization selective optical element in a third direction distinct from the second direction.

In accordance with some embodiments, a display device includes a spatial light modulator and an optical device configured to illuminate the spatial light modulator. The optical device for illuminating one or more portions of a spatial light modulator includes a waveguide, an array of tunable retarders and a polarization selective optical element. The array of tunable retarders is positioned relative to the waveguide so that a respective tunable retarder of the array of tunable retarders receives light from the waveguide. The respective tunable retarder has a first state, which causes the respective tunable retarder to direct light having a first polarization in a first direction, and a second state, distinct from the first state, which causes the respective tunable retarder to direct light having a second polarization in the first direction. The second polarization is distinct from the first polarization. The polarization selective optical element is located adjacent to the array of tunable retarders so that the light having the first polarization propagates from the polarization selective optical element in a second direction and the light having the second polarization propagates from the polarization selective optical element in a third direction distinct from the second direction.

In accordance with some embodiments, a method for illuminating one or more portions of a spatial light modulator is performed at an optical device including a waveguide, an array of tunable retarders, and a polarization selective optical element located adjacent to the array of tunable retarders. The method includes receiving light, by a respective tunable retarder, from the waveguide and providing, by the respective tunable retarder, while the respective tunable retarder is in a first state, light having a first polarization. The method further includes providing, by the respective tunable retarder, while the respective tunable retarder is in a second state, light having a second polarization. The method also includes directing, with the polarization selective optical element, the light having the first polarization in a first direction toward a respective portion of the one or more portions of the spatial light modulator and directing, with the polarization selective optical element, the light having the second polarization in a second direction distinct from the first direction.

In accordance with some embodiments, a display device includes a waveguide and an array of tunable retarders in contact with the waveguide. A respective tunable retarder of the array of tunable retarders receives light from the waveguide. The respective tunable retarder has a first state, which causes the respective tunable retarder to direct light having a first polarization in a first direction, and a second state, distinct from the first state, which causes the respective tunable retarder to direct light having a second polarization that is distinct from the first polarization in the first direction. The display device also includes a polarization selective optical element located adjacent to the array of tunable retarders so that the light having the first polarization propagates from the polarization selective optical element in a second direction and the light having the second polarization propagates from the polarization selective optical element in a third direction distinct from the second direction.

In accordance with some embodiments, a method is performed at a display device including a waveguide, an array of tunable retarders and a polarization selective optical element located adjacent to the array of tunable retarders. The method includes receiving, by a respective tunable retarder, light from the waveguide and providing, by the respective tunable retarder, while the respective tunable retarder is in a first state, light having a first polarization in a first direction. The method also includes providing, by the respective tunable retarder, while the respective tunable retarder is in a second state, light having a second polarization in the first direction. The method also includes directing, with the polarization selective optical element, the light having the first polarization in a second direction and the light having the second polarization in a third direction distinct from the first direction.

In accordance with some embodiments, an optical device for illuminating one or more portions of a spatial light modulator includes a waveguide, an array of tunable retarders and a polarization selective optical element. The array of tunable retarders is positioned relative to the waveguide so that a respective tunable retarder of the array of tunable retarders receives light having a first polarization. While in a first state, the respective tunable retarder provides light having a second polarization in a first direction, and while in a second state distinct from the first state, the respective tunable retarder provides light having a third polarization in the first direction. The third polarization is distinct from the second polarization. The polarization selective optical element is located adjacent to the array of tunable retarders so that the light having the second polarization propagates from the polarization selective optical element in a second direction and the light having the third polarization propagates from the polarization selective optical element in a third direction distinct from the second direction.

In accordance with some embodiments, a display device includes a spatial light modulator and an optical device configured to illuminate the spatial light modulator. The optical device for illuminating one or more portions of a spatial light modulator includes a waveguide, an array of tunable retarders and a polarization selective optical element. The array of tunable retarders is positioned relative to the waveguide so that a respective tunable retarder of the array of tunable retarders receives light having a first polarization. While in a first state, the respective tunable retarder provides light having a second polarization in a first direction, and while in a second state distinct from the first state, the respective tunable retarder provides light having a third polarization in the first direction. The third polarization is distinct from the second polarization. The polarization selective optical element is located adjacent to the array of tunable retarders so that the light having the second polarization propagates from the polarization selective optical element in a second direction and the light having the third polarization propagates from the polarization selective optical element in a third direction distinct from the second direction.

In accordance with some embodiments, a method for illuminating one or more portions of a spatial light modulator is performed at an optical device including a waveguide, an array of tunable retarders, and a polarization selective optical element located adjacent to the array of tunable retarders. The method includes receiving, by a respective tunable retarder, light having a first polarization and providing, by the respective tunable retarder, while in a first state, light having a second polarization. The method further includes providing, by the respective tunable retarder, while in a second state, light having a third polarization. The method also includes providing, with the polarization selective optical element, the light having the second polarization in a first direction toward a respective portion of the one or more portions of the spatial light modulator and directing, with the polarization selective optical element, the light having the third polarization in a second direction distinct from the first direction.

In accordance with some embodiments, a display device includes a waveguide and an array of tunable retarders embedded inside the waveguide. A respective tunable retarder of the array of tunable retarders receives light having a first polarization. While the respective tunable retarder is in a first state, the respective tunable retarder provides light having a second polarization in a first direction, and while the respective tunable retarder is in a second state distinct from the first state, the respective tunable retarder provides light having a third polarization that is distinct from the second polarization in the first direction. The display device also includes a polarization selective optical element located adjacent to the array of tunable retarders so that the light having the second polarization propagates from the polarization selective optical element in a second direction and the light having the third polarization propagates from the polarization selective optical element in a third direction distinct from the second direction.

In accordance with some embodiments, a method is performed at a display device including a waveguide, an array of tunable retarders and a polarization selective optical element located adjacent to the array of tunable retarders. The method includes receiving, by a respective tunable retarder, light having a first polarization and providing, by the respective tunable retarder, while the respective tunable retarder is in a first state, light having a second polarization in a first direction. The method also includes providing, by the respective tunable retarder, while the respective tunable retarder is in a second state, light having a third polarization in the first direction. The method also includes directing, with the polarization selective optical element, the light having the second polarization in a second direction and the light having the third polarization in a third direction distinct from the first direction.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 3 is an isometric view of a display device in accordance with some embodiments.

FIGS. 8A-8D are schematic diagrams illustrating a polarization volume holographic grating in accordance with some embodiments.

Figure 1:
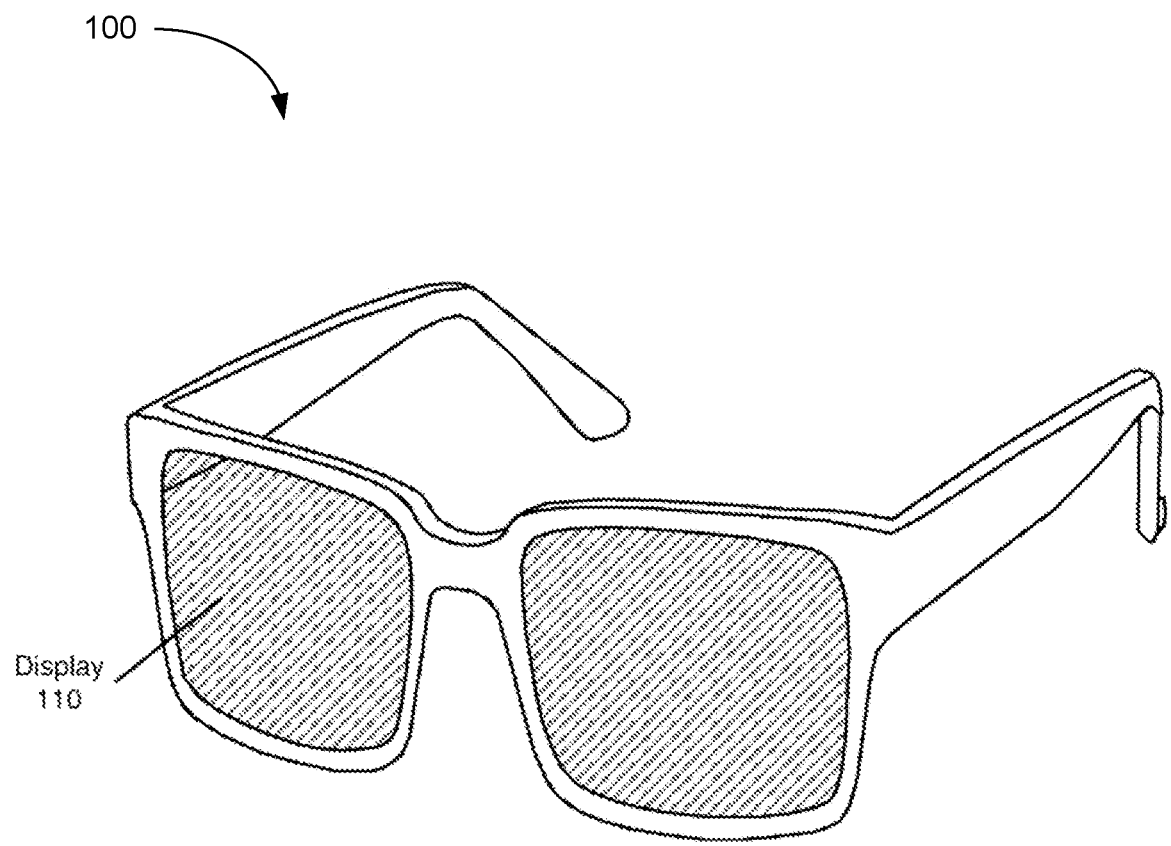
FIG. 1 is a perspective view of a display device in accordance with some embodiments.

These figures are not drawn to scale unless indicated otherwise.

DETAILED DESCRIPTION

Reflective spatial light modulator (SLM) displays, such as liquid crystal on silicon (LCoS) displays, are desirable for head-mounted display devices because they provide high brightness and high efficiency, and are suitable for small sized displays (e.g., microdisplays). Furthermore, reflective SLMs have a reduced screen door effect (e.g., visibility of gaps between pixels) compared to conventional transmissive displays because circuitry required for pixels is disposed behind the pixels, rather than around the pixels. Conventional illuminators for SLMs (e.g., conventional LCoS illuminators), however, are inefficient because they provide a uniform illumination throughout an area of a reflective SLM. Therefore, there is a need for compact and light-weighted illumination systems for selectively illumination one or more regions of reflective SLMs.

The optical device of the present disclosure provides selective illumination of one or more regions of a reflective SLM for reduced power consumption and improved uniformity of the illumination. The optical device includes an array of pixelated tunable retarders for modulating polarization of light propagating inside a waveguide, and a polarization selective optical element for out-coupling portions of the light to exit the waveguide onto the one or more regions of the reflective SLM.

Additionally, the present disclosure provides for a compact sized SLM display having an array of pixelated tunable retarders (e.g., liquid crystals pixels) embedded inside a waveguide for outputting image light, a polarization selective optical element for out-coupling portions of the image light to exit the waveguide onto a reflector positioned outside the waveguide for reflecting the image light output by the array of pixelated tunable retarders.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first retarder could be termed a second retarder, and, similarly, a second retarder could be termed a first retarder, without departing from the scope of the various described embodiments. The first retarder and the second retarder are both retarders, but they are not the same retarder.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

FIG. 1 illustrates display device 100 in accordance with some embodiments. In some embodiments, display device 100 is configured to be worn on a head of a user (e.g., by having the form of spectacles or eyeglasses, as shown in FIG. 1) or to be included as part of a helmet that is to be worn by the user. When display device 100 is configured to be worn on a head of a user or to be included as part of a helmet, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user). As shown in FIG. 1, display device 100 includes display 110. Display 110 is configured for presenting visual contents (e.g., augmented reality contents, virtual reality contents, mixed reality contents, or any combination thereof) to a user.

Figure 2:
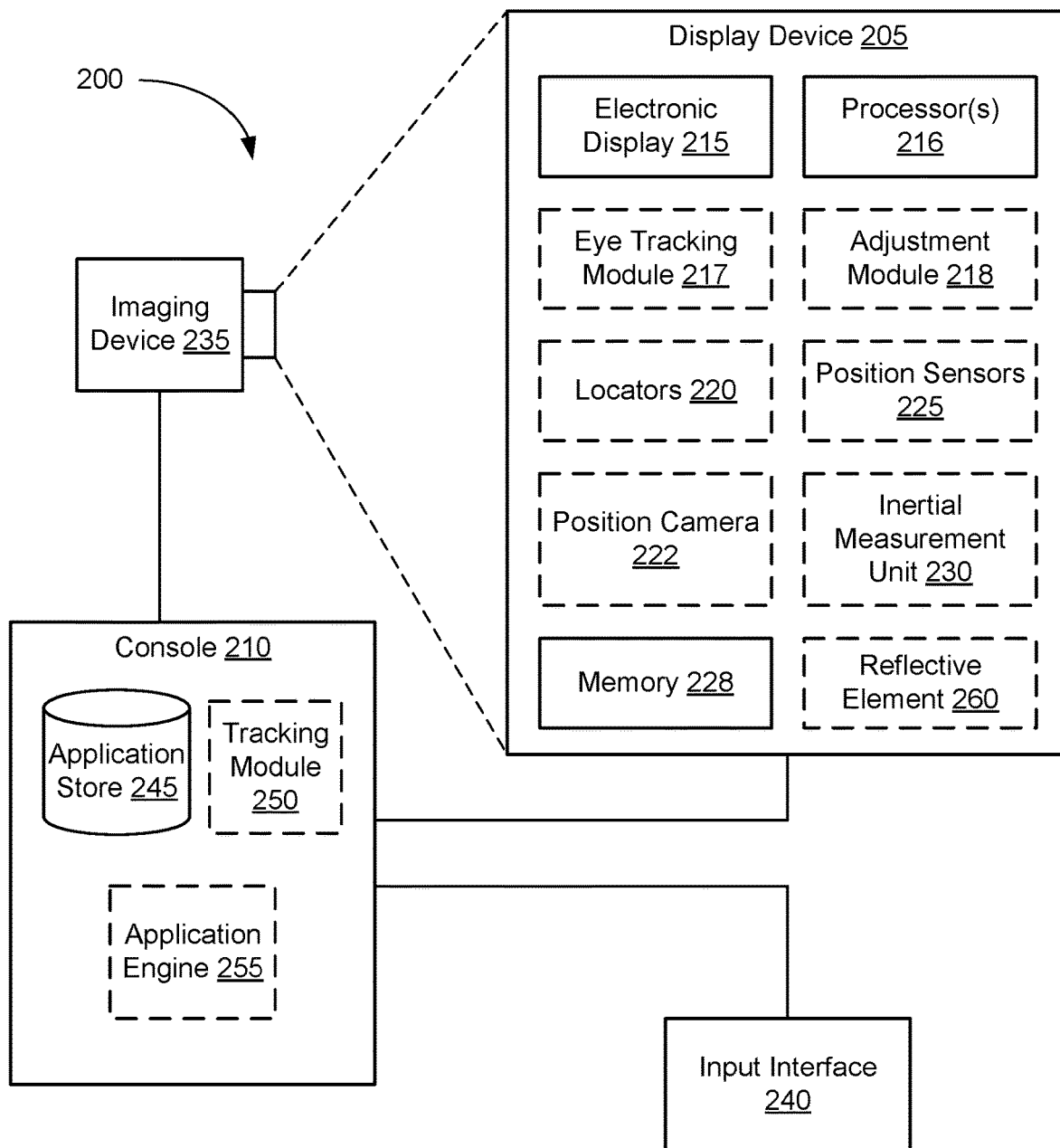
FIG. 2 is a block diagram of a system including a display device in accordance with some embodiments.

In some embodiments, display device 100 includes one or more components described herein with respect to FIG. 2. In some embodiments, display device 100 includes additional components not shown in FIG. 2.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including one display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver augmented reality, virtual reality, and mixed reality.

In some embodiments, as shown in FIG. 1, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in an augmented environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operate as a virtual reality (VR) device, an augmented reality (AR) device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, one or more reflective elements 260 or a subset or superset thereof (e.g., display device 205 with electronic display 215, one or more processors 216, and memory 228, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable display element or multiple adjustable display elements (e.g., a display for each eye of a user). In some embodiments, electronic display 215 is configured to display images to the user by projecting the images onto one or more reflective elements 260.

In some embodiments, the display element includes one or more light emission devices and a corresponding array of spatial light modulators. A spatial light modulator is an array of electro-optic pixels, opto-electronic pixels, some other array of devices that dynamically adjust the amount of light transmitted by each device, or some combination thereof. These pixels are placed behind one or more lenses. In some embodiments, the spatial light modulator is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The spatial light modulator is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array. In some embodiments, electronic display 215 projects images to one or more reflective elements 260, which reflect at least a portion of the light toward an eye of a user.

One or more lenses direct light from the arrays of light emission devices (optionally through the emission intensity arrays) to locations within each eyebox and ultimately to the back of the user's retina(s). An eyebox is a region that is occupied by an eye of a user located proximity to display device 205 (e.g., a user wearing display device 205) for viewing images from display device 205. In some cases, the eyebox is represented as a 10 mm×10 mm square. In some embodiments, the one or more lenses include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed. As used herein, IR refers to light with wavelengths ranging from 700 nm to 1 mm including near infrared (NIR) ranging from 750 nm to 1500 nm.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is used to also determine location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described herein.

Adjustment module 218 generates an image frame based on the determined locations of the pupils. In some embodiments, this sends a discrete image to the display that will tile subimages together thus a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display to not pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 500 nm to 750 nm), in the infrared band (e.g., about 750 nm to 1 mm), in the ultraviolet band (about 100 nm to 500 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is configured to optionally detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light towards the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

In some embodiments, display device 205 optionally includes one or more reflective elements 260. In some embodiments, electronic display device 205 optionally includes a single reflective element 260 or multiple reflective elements 260 (e.g., a reflective element 260 for each eye of a user). In some embodiments, electronic display device 215 projects computer-generated images on one or more reflective elements 260, which, in turn, reflect the images toward an eye or eyes of a user. The computer-generated images include still images, animated images, and/or a combination thereof. The computer-generated images include objects that appear to be two-dimensional and/or three-dimensional objects. In some embodiments, one or more reflective elements 260 are partially transparent (e.g., the one or more reflective elements 260 have a transmittance of at least 15%, 20%, 25%, 30%, 35%, 50%, 55%, or 50%), which allows transmission of ambient light. In such embodiments, computer-generated images projected by electronic display 215 are superimposed with the transmitted ambient light (e.g., transmitted ambient image) to provide augmented reality images.

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described herein may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in an augmented environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

FIG. 3 is an isometric view of display device 300 in accordance with some embodiments. In some other embodiments, display device 300 is part of some other electronic display (e.g., a digital microscope, a head-mounted display device, etc.). In some embodiments, display device 300 includes light emission device 310 and an optical assembly 330, which may include one or more lenses and/or other optical components. In some embodiments, display device 300 also includes an IR detector array.

Light emission device 310 emits image light and optional IR light toward the viewing user. Light emission device 310 includes one or more light emission components that emit light in the visible light (and optionally includes components that emit light in the IR). Light emission device 310 may include, e.g., an array of LEDs, an array of microLEDs, an array of OLEDs, or some combination thereof.

In some embodiments, light emission device 310 includes an emission intensity array (e.g., a spatial light modulator) configured to selectively attenuate light emitted from light emission device 310. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner, the emission intensity array is able to provide image light and/or control what portion of the image light is passed to the optical assembly 330. In some embodiments, display device 300 uses the emission intensity array to facilitate providing image light to a location of pupil 350 of eye 340 of a user, and minimize the amount of image light provided to other areas in the eyebox.

The optical assembly 330 includes one or more lenses. The one or more lenses in optical assembly 330 receive modified image light (e.g., attenuated light) from light emission device 310, and direct the modified image light to a location of pupil 350. The optical assembly 330 may include additional optical components, such as color filters, mirrors, etc.

An optional IR detector array detects IR light that has been retro-reflected from the retina of eye 340, a cornea of eye 340, a crystalline lens of eye 340, or some combination thereof. The IR detector array includes either a single IR sensor or a plurality of IR sensitive detectors (e.g., photodiodes). In some embodiments, the IR detector array is separate from light emission device array 310. In some embodiments, the IR detector array is integrated into light emission device array 310.

In some embodiments, light emission device 310 including an emission intensity array make up a display element. Alternatively, the display element includes light emission device 310 (e.g., when light emission device array 310 includes individually adjustable pixels) without the emission intensity array. In some embodiments, the display element additionally includes the IR array. In some embodiments, in response to a determined location of pupil 350, the display element adjusts the emitted image light such that the light output by the display element is refracted by one or more lenses toward the determined location of pupil 350, and not toward other locations in the eyebox.

In some embodiments, display device 300 includes one or more broadband sources (e.g., one or more white LEDs) coupled with a plurality of color filters, in addition to, or instead of, light emission device 310.

In some embodiments, display device 300 (or light emission device array 310 of display device 300) includes a reflective spatial light modulator, such as a Liquid Crystal on Silicon (LCoS) spatial light modulator. In some embodiments, the LCoS spatial light modulator includes liquid crystals. In some embodiments, the LCoS spatial light modulator includes ferroelectric liquid crystals. The reflective spatial light modulator has an array of pixels (or subpixels), and a respective pixel (or a respective subpixel) is individually controlled to reflect light impinging thereon (e.g., a pixel is activated to reflect light impinging thereon or deactivated to cease reflecting the light impinging thereon). In some embodiments, display device 300 includes multiple reflective spatial light modulators (e.g., a first reflective spatial light modulator for a first color, such as red, a second reflective spatial light modulator for a second color, such as green, and a third reflective spatial light modulator for a third color, such as blue). Such reflective spatial light modulator requires an illuminator that provides light to the reflective spatial light modulator.

Figure 4A:
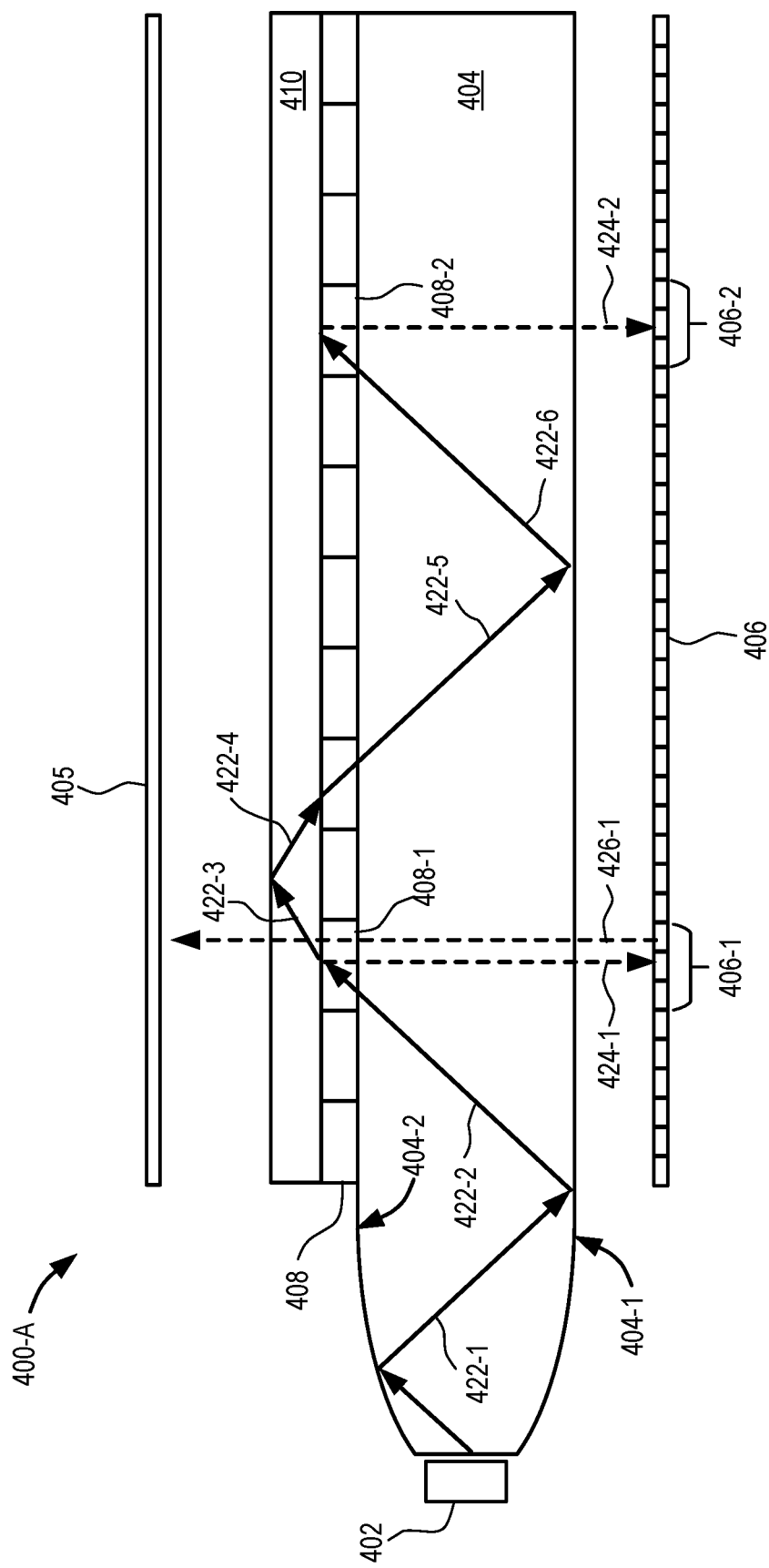
FIG. 4A is a schematic diagram illustrating an optical device for illuminating a spatial light modulator (SLM), in accordance with some embodiments.
Figure 5:
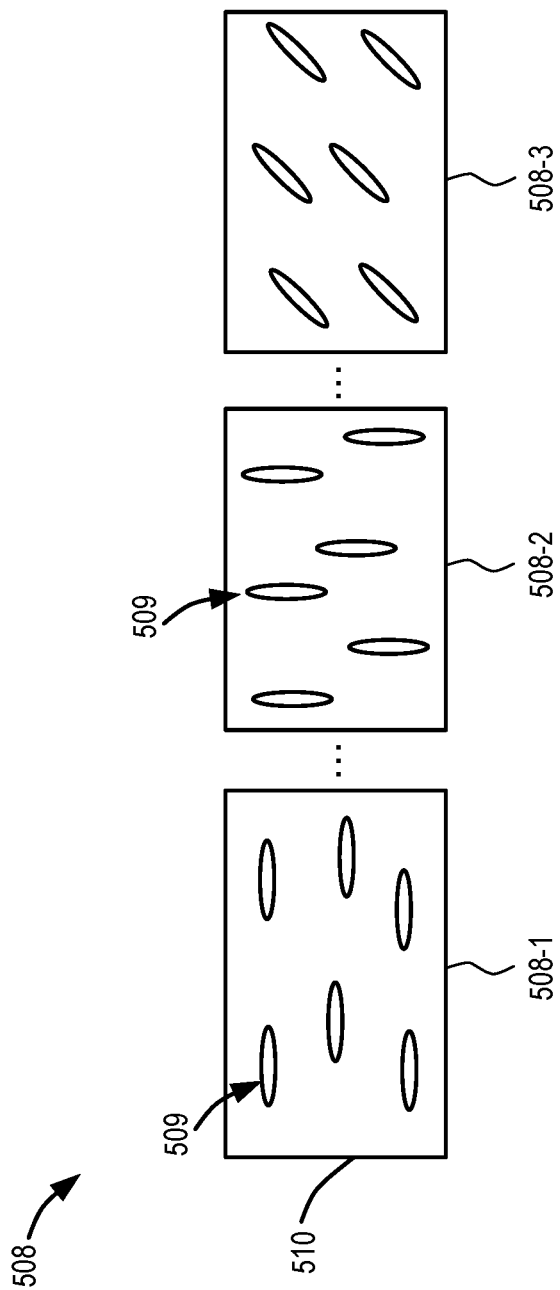
FIG. 5 is a schematic diagram illustrating an array of tunable retarders, in accordance with some embodiments.

FIG. 4A is a schematic diagram illustrating optical device 400-A for illuminating SLM 406, in accordance with some embodiments. Optical device 400-A includes waveguide 404 coupled with an array of tunable retarders 408, and polarization selective optical element 410 positioned adjacent to the array of tunable retarders 408. The array of tunable retarders 408 includes a plurality of tunable retarders, which includes liquid crystals that are switchable between distinct states (e.g., two or more states as shown in FIG. 5). Thus, the array of tunable retarders 408 may modulate polarization of light propagating inside waveguide 404. For example, a respective tunable retarder of the array of tunable retarders 408 may operate as a half-wave plate while the respective tunable retarder is in a first state (e.g., an "off" state) and operate as a substrate with no polarization retardation while the respective tunable retarder is in a second state (e.g., an "on" state) that is different from the first state. As a result, while the respective tunable retarder is in the first state, the respective tunable retarder modifies the polarization of the light transmitted through the respective tunable retarder, and while the respective tunable retarder is in the second state, the respective tunable retarder does not modify the polarization of the light transmitted through the respective tunable retarder. Alternatively, while the respective tunable retarder is in the first state, the respective tunable retarder modifies the polarization of the light transmitted through the respective tunable retarder in a first manner (e.g., the respective tunable retarder rotates a polarization of the transmitted light by a first angle), and while the respective tunable retarder is in the second state, the respective tunable retarder does not modify the polarization of the light transmitted through the respective tunable retarder in a second manner that is different from the first manner (e.g., the respective tunable retarder rotates the polarization of the transmitted light by a second angle that is different from the first angle).

When optical device 400-A is optically coupled with light source 402, light 422-1 from light source 402 propagates within waveguide 404 (e.g., by bouncing off surfaces 404-1 and 404-2 of waveguide 404 via total internal reflection), and bounced light 422-2 impinges on tunable retarder 408-1. In some embodiments, while the tunable retarder 408-1 is in the first state, the tunable retarder 408-1 changes the polarization of the light transmitted through the tunable retarder 408-1, and while the tunable retarder 408-1 is in the second state, the tunable retarder 408-1 does not change the polarization of the light transmitted through the tunable retarder 408-1 (or changes the polarization of the light transmitted through the tunable retarder 408-1 in a manner different from the change caused by the tunable retarder 408-1 in the first state). In some embodiments, light source 402 includes one or more light emitting diodes (LED), one or more superluminescent diodes (SLED), or one or more laser diodes.

In some embodiments, polarization selective optical element 410 transmits light having a first polarization (e.g., a first circular polarization or a first linear polarization) and redirects light having a second polarization distinct from the first polarization (e.g., a second circular polarization orthogonal to the first circular polarization or a second linear polarization orthogonal to the first linear polarization). In some embodiments, polarization selective optical element 410 is a liquid crystal based polarization selective element, a polarization selective element including a metasurface, a polarization selective element including a resonant structured surface, a polarization selective element including a continuous chiral layer, or a polarization selective element including a birefringent material. For example, a polarization selective element including a continuous chiral layer can be selective on circularly polarized light (e.g., transmits a first circularly polarized light and redirects a second circularly polarized light). In another example, a polarization selective element including a metasurface or resonant structures can be selective either on linearly polarized light or circularly polarized light (e.g., transmits a first linearly or circularly polarized light and redirects a second linearly or circularly polarized light). In some embodiments, polarization selective optical element 410 is a polarization volume hologram (PVH) grating (e.g., a polarization volume hologram grating 800 described below with respect to FIGS. 8A-8D). A PVH grating (e.g., PVH grating 800) is selective with respect to circular polarization, incident angle, and/or wavelength range of light incident thereon. For example, the PVH grating 800 may transmit light having first circular polarization and diffract or reflect light having a second circular polarization that is orthogonal to the first circular polarization.

Polarization selective optical element 410 is positioned to receive light from array of tunable retarders 408 and, based on a polarization of the received light, either redirects the light (e.g., light 424-1 is steered to exit from waveguide 404), or transmits the light to continue to propagate inside waveguide 404 through total internal reflection (e.g., light 422-3, 422-4, 422-5, and 422-6). For example, while the tunable retarder 408-1 is in the first state, the tunable retarder 408-1 modifies the polarization of the transmitted light so that polarization selective optical element 410 redirects the transmitted light (e.g., the light transmitted through the tunable retarder 408-1 is diffracted into a different direction by polarization selective optical element 410) as light 424-1 for illuminating a portion of SLM 406 (e.g., portion 406-1 of SLM 406), and while the tunable retarder 408-1 is in the second state, the tunable retarder 408-1 does not modify the polarization of the transmitted light so that polarization selective optical element 410 transmits the light transmitted through the tunable retarder 408-1 to continues to propagate along waveguide 404 as light 422-3. In some cases, the tunable retarder 408-1 is in a third state that is different from the first state and the second state, and the tunable retarder 408-1 modifies the polarization of the transmitted light so that polarization selective optical element 410 redirects a first portion of the transmitted light for illuminating portion 406-1 of SLM 406 and polarization selective optical element 410 transmits a second portion of the transmitted light (e.g., light 422-3) for propagation along waveguide 404. For example, while the tunable retarder 408-1 is in the third state, the tunable retarder 408-1 rotates the polarization of the transmitted light so that the transmitted light has both a component having s-polarization and a component having p-polarization. Similarly, while the tunable retarder 408-2 is in the first state, the tunable retarder 408-2 modifies the polarization of the transmitted light so that polarization selective optical element 410 redirects the transmitted light (e.g., the light transmitted through the tunable retarder 408-2 is diffracted into a different direction) as light 424-2 for illuminating portion 406-2 of SLM 406, and while the tunable retarder 408-2 is in the second state, the tunable retarder 408-2 does not modify the polarization of the transmitted light so that polarization selective optical element 410 transmits the light transmitted through the tunable retarder 408-2 to continues to propagate along waveguide 404. In FIG. 4A, depending on the state of tunable retarder 408-2, the entire light 422-2 impinging on tunable retarder 408-2 is either redirected to illuminate portion 406-1 of SLM 406 or alternatively, the entire light 422-2 impinging on tunable retarder 408-2 continues to propagate along waveguide 404.

In some embodiments, polarization selective optical element 410 is, in addition to being polarization selective, also incident angle selective (e.g., light having an incident angle within a predefined range (and having a particular polarization) is redirected by polarization selective optical element 410 and light having an incident angle outside the predefined range is transmitted by polarization selective optical element 410 regardless of the polarization of the light). As shown in FIG. 4A, polarization selective optical element 410 redirects light having a first circular polarization and a first incident angle (e.g., light 422-2 having the first circular polarization is redirected as light 424-1) and transmits light having a second incident angle distinct from the first incident angle (e.g., light 426-1 having a small incident angle is transmitted through polarization selective optical element 410).

SLM 406, including portions 406-1 and 406-2, is positioned to receive light 424-1 from polarization selective optical element 410 and outputs at least a portion of the received light as image light (e.g., image light 426-1). For example, SLM 406 includes a plurality of pixels (e.g., in FIG. 4A, each of portions 406-1 and 406-2 includes three pixels) and each pixel of the plurality of pixels is individually activatable. While a respective pixel of the plurality of pixels in an activated state, the respective pixel reflects the received light (e.g., the pixel receiving the light 424-1 reflects the received light as image light 426-1), and while the respective pixel is in a deactivated state, the respective pixel does not reflect the received light (e.g., the pixel receiving the light 424-2 does not reflect the received light). For example, while the respective pixel is in the deactivated state, the respective pixel may absorb the received light.

In some embodiments, optical device 400-A is optically coupled with polarizer 405 (e.g., a cleanup polarizer). Polarizer 405 is positioned to receive image light 426-1 and transmits only a portion of image light 426-1 having a particular polarization (e.g., light having a polarization other than the particular polarization is absorbed by polarizer 405). Although FIGS. 4B-4D do not show polarizer 405, optical devices shown in FIGS. 4B-4D may also include, or be coupled with, polarizer 405 to remove light having a polarization other than the particular polarization.

Figure 4B:
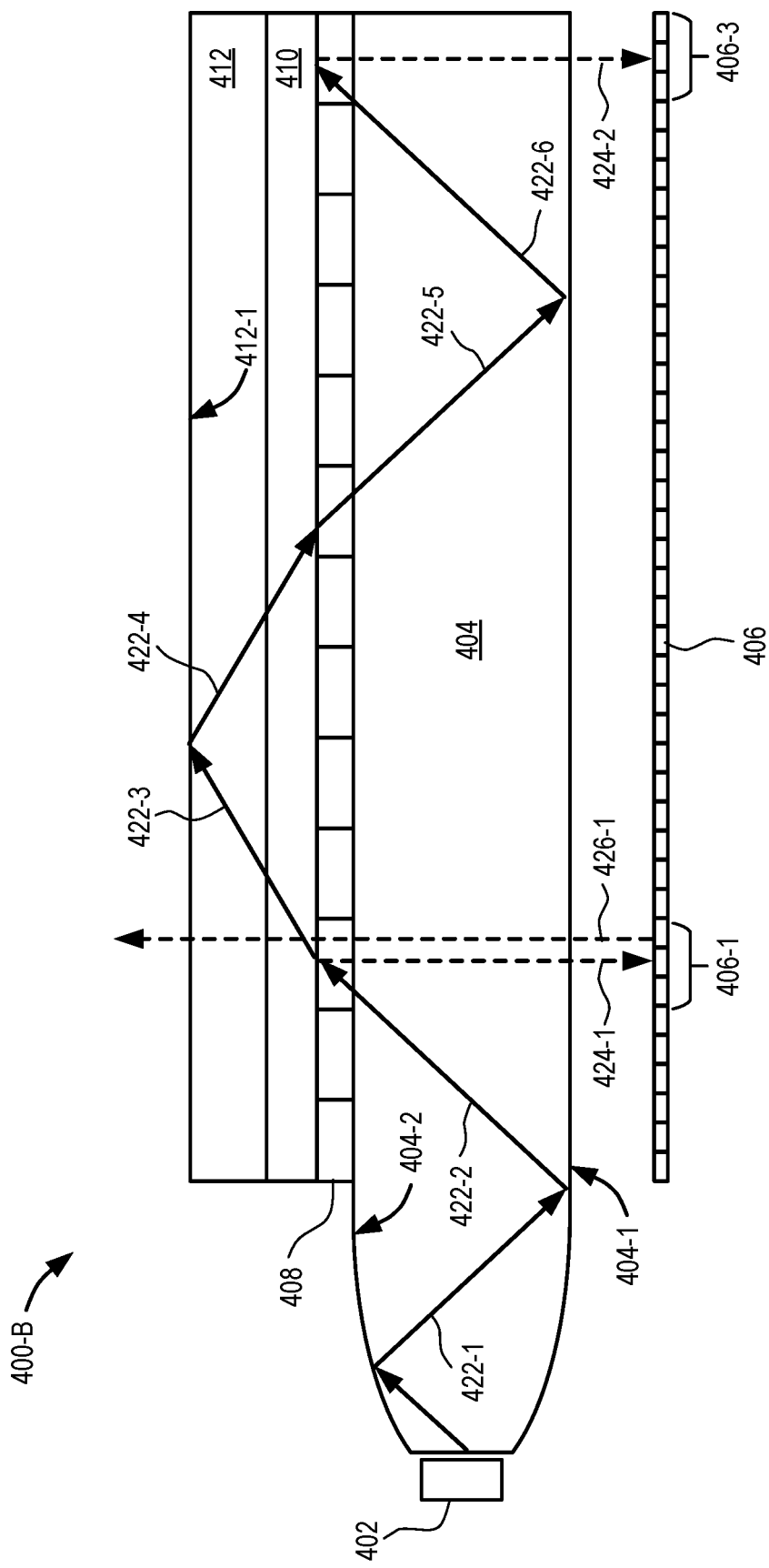
FIG. 4B is a schematic diagram illustrating an optical device for illuminating a SLM, in accordance with some embodiments.

FIG. 4B is a schematic diagram illustrating optical device 400-B for illuminating SLM 406, in accordance with some embodiments. Optical device 400-B is similar to optical device 400-A described above with respect to FIG. 4A, except that optical device 400-B includes substrate 412 (e.g., a glass substrate) coupled with polarization selective optical element 410 (e.g., substrate 412 is located in contact with the polarization selective optical element 410 on the opposite side of the array of tunable retarders 408). Substrate 412 is positioned to receive light (e.g., light 422-3) from the array of tunable retarders 408 and transmitted through polarization selective optical element 410 so that the light undergoes total internal reflection at surface 412-1 of substrate 412 and continues to propagate along waveguide 404 (e.g., light 422-3 is internally reflected as light 422-4 and continues to propagate along waveguide 404 as light 422-5 and 422-6). In some embodiments, substrate 412 is coupled with a conductive material, such as indium tin oxide, which provides an electric field across the array of tunable retarders 408 or one or more portions thereof (e.g., for applying voltage to tune respective tunable retarders). For example, the conductive material may be positioned between polarization selective optical element 410 and substrate 412. Alternatively, the conductive material may be positioned on substrate 412 away from polarization selective optical element 410 (e.g., the conductive material is located on top of substrate 412).

Figure 4C:
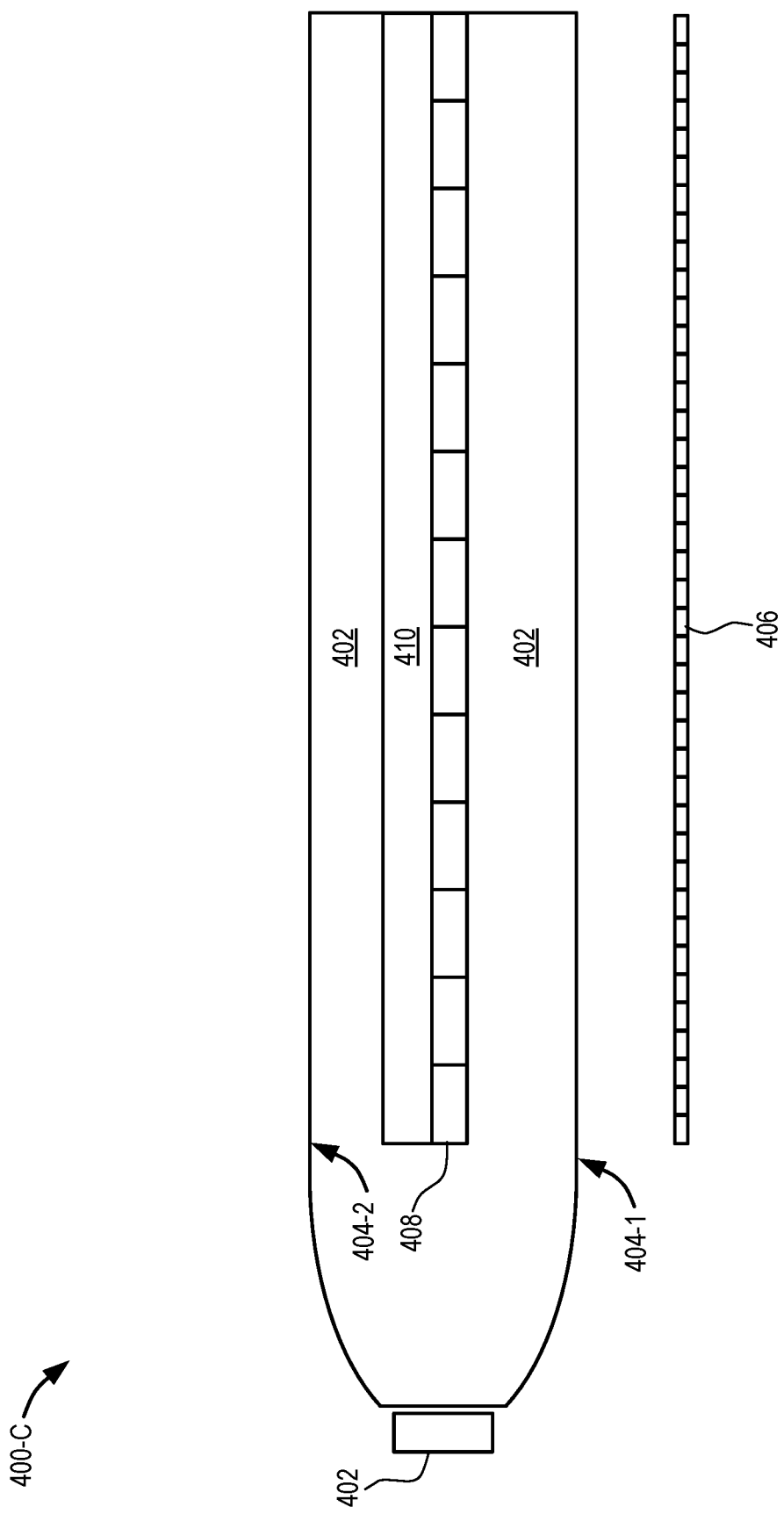
FIG. 4C is a schematic diagram illustrating an optical device for illuminating a SLM, in accordance with some embodiments.

FIG. 4C is a schematic diagram illustrating optical device 400-C for illuminating SLM 406, in accordance with some embodiments. Optical device 400-C is similar to optical device 400-A described with respect to FIG. 4A, except that in FIG. 4C, array of tunable retarders 408 and polarization selective optical element 410 are embedded inside waveguide 404.

Figure 4D:
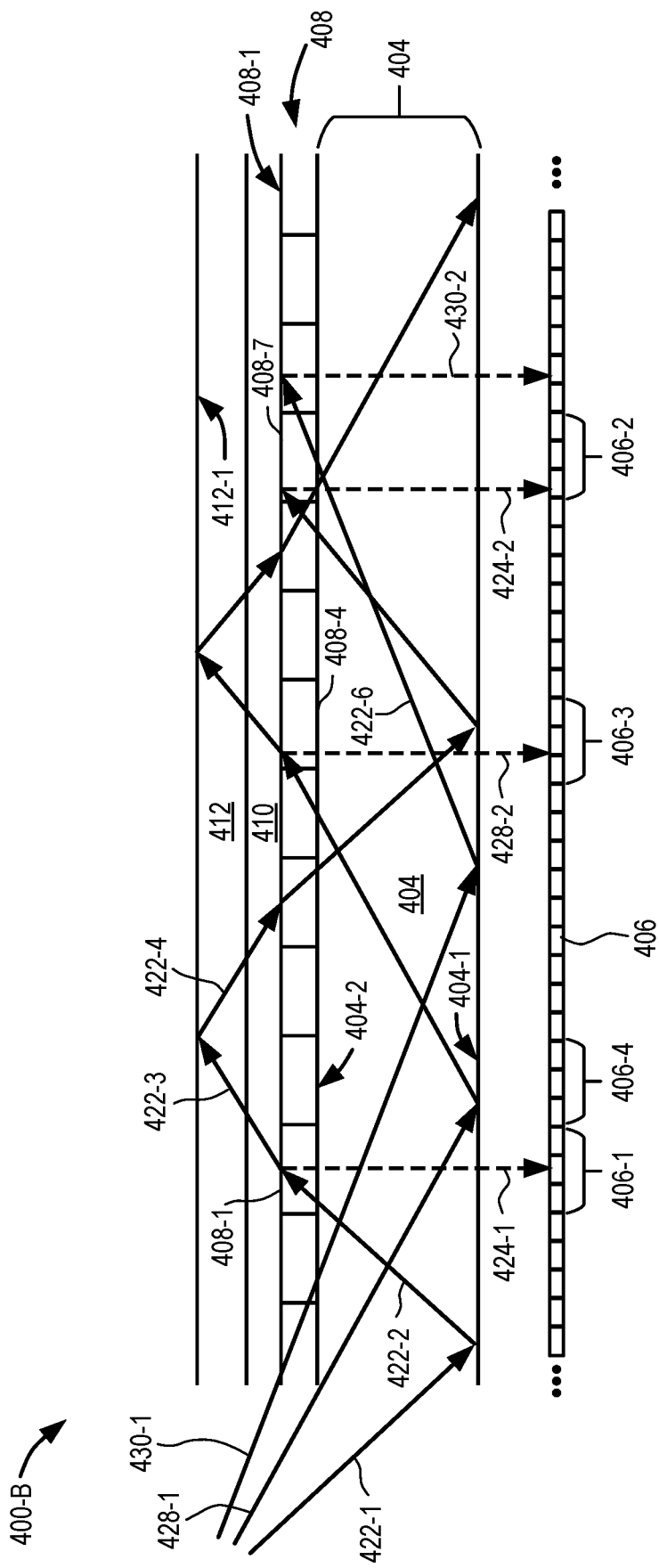
FIG. 4D is a schematic diagram illustrating light propagating in the optical device of FIG. 4B, in accordance with some embodiments.

FIG. 4D is a schematic diagram illustrating light propagating in optical device 400-B, in accordance with some embodiments. As shown, optical device 400-B provides selective illumination of distinct portions of SLM 406. In FIG. 4D, light 424-1 illuminates portion 406-1 of SLM 406, light 428-2 illuminates portion 406-3 of SLM 406, and light 424-2 illuminates portion 406-2 of SLM 406, while other portions of SLM 406 (e.g., portion 406-4) are not illuminated. In some embodiments, light 406-1, 406-2, and 406-3 have distinct intensities.

This zonal illumination of SLM 406 reduces or eliminates the need for illuminating the entire surface of SLM 406, which, in turn, improves the efficiency of a display device that includes SLM 406, reduces the energy consumption, increases the operational time and the battery life, and reduces the size and weight associated with the energy storage, such as batteries.

FIG. 5 is a schematic diagram illustrating a cross-sectional view of an array of tunable retarders 508, in accordance with some embodiments. In some embodiments, the array of tunable retarders 508 corresponds to the array of tunable retarders 408 of optical device 400-A shown in FIG. 4A. A respective tunable retarder includes liquid crystals (e.g., liquid crystals 509) embedded in a cell (e.g., cell 510) so that the liquid crystals may be switched among different states (e.g., states 508-1, 508-2, and 508-3) by, for example, altering a voltage applied across cell 510. As shown in FIG. 5, the applied voltage controls orientation and/or alignment of liquid crystals 509. In some embodiments, while a first voltage differential is applied across the liquid crystals in the cell, the liquid crystals in the cell (and the tunable retarder containing the liquid crystals) are in the first state (e.g., state 508-1), and while a second voltage differential that is different from the first voltage differential is applied across the liquid crystals in the cell, the liquid crystals in the cell (and the tunable retarder containing the liquid crystals) are in the second state (e.g., state 508-2). In addition, in some cases, while a third voltage differential that is different from the first voltage differential and the second voltage differential is applied across the liquid crystals in the cell, the liquid crystals in the cell (and the tunable retarder containing the liquid crystals) are in the third state (e.g., state 508-3).

Figure 6A:
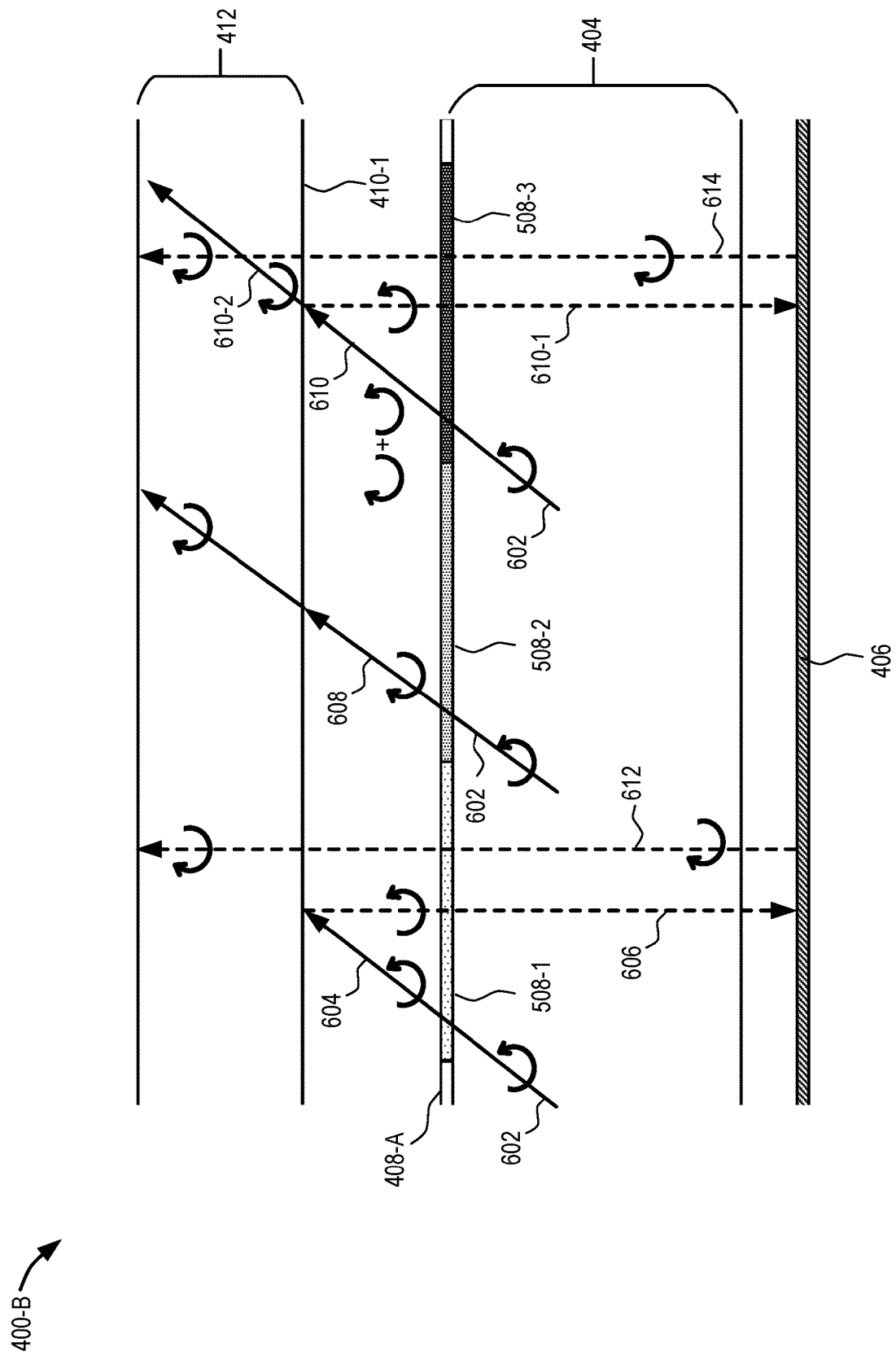
FIGS. 6A-6C are schematic diagrams illustrating polarization of light propagating in the optical device of FIG. 4B, in accordance with some embodiments.
Figure 6B:
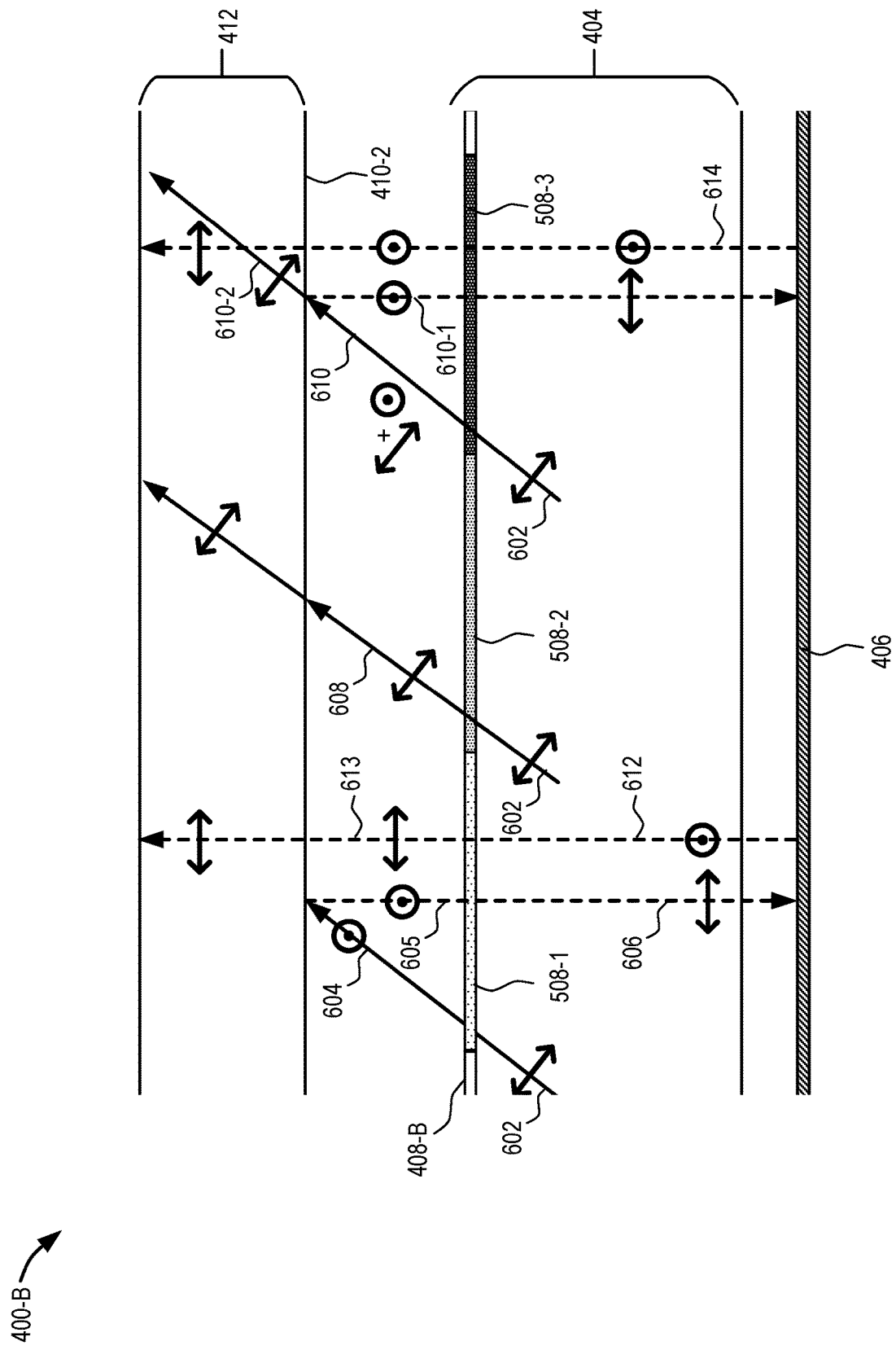
Figure 6C:
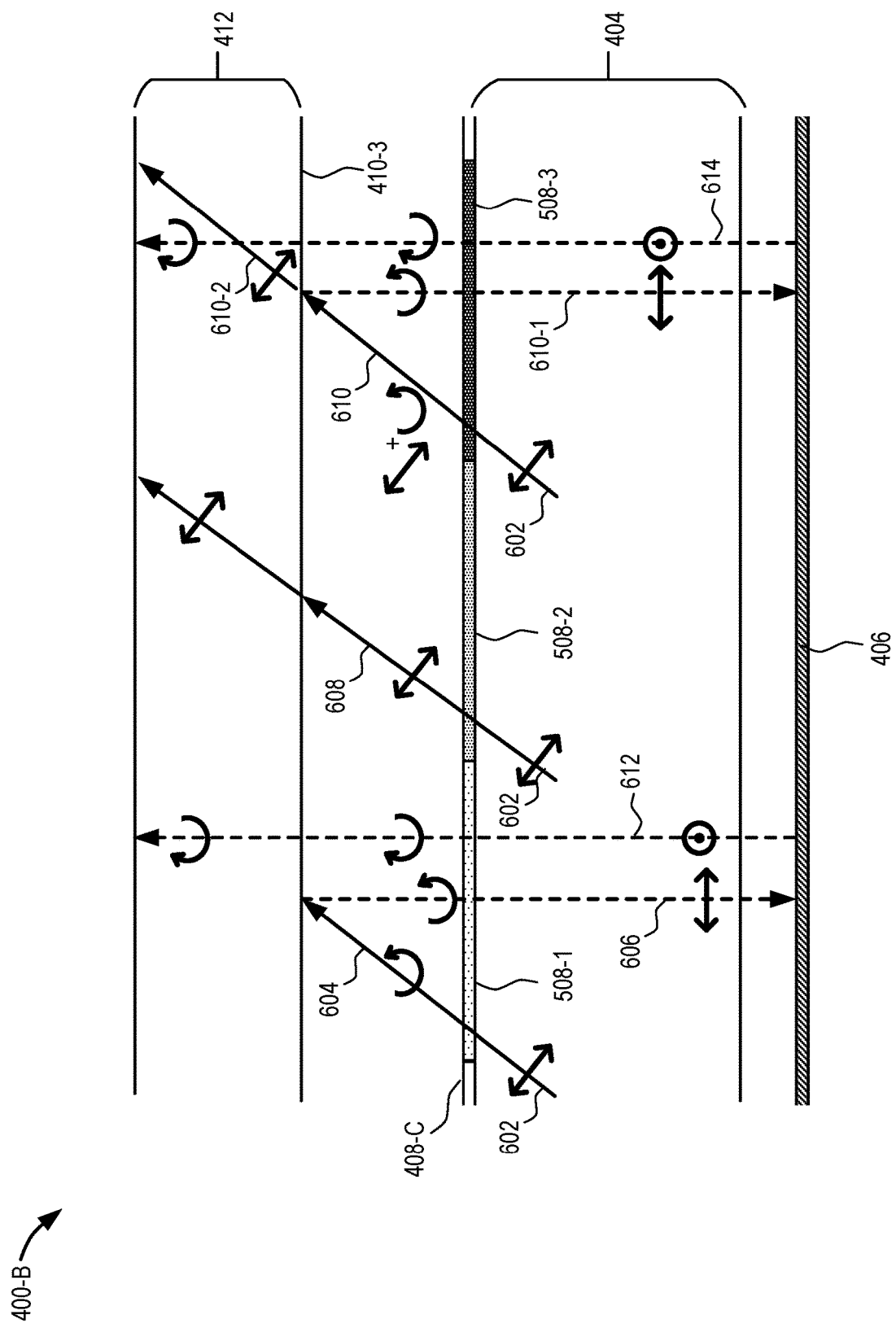

FIGS. 6A-6C are schematic diagrams illustrating polarization of light propagating in optical device 400-B, in accordance with some embodiments. Portions of optical device 400-B illustrated in FIGS. 6A-6C include waveguide 404, array of tunable retarders 408 (e.g., 408-A, 408-B, or 408-C), polarization selective optical element 410 (e.g., 410-1, 410-2, or 410-3), and substrate 412. It is noted that in FIGS. 6A-6C, polarization of light is annotated with universal annotations that do not take into account a propagation direction of a respective light (e.g., the right-handed circularly polarized light is annotated with a counter-clockwise arrow regardless of the propagation direction of light, and the left-handed circularly polarized light is annotated with a clockwise arrow regardless of the propagation direction of light).

In FIG. 6A, incident light 602 has a first circular polarization. Array of tunable retarders 408-A is configured to, depending on the state of the respective tunable retarder, either (i) change the first circular polarization to a second circular polarization that is orthogonal to the first circular polarization (e.g., tunable retarder 508-2 is in a first state to change the polarization of incident light 602 so that transmitted light 608 has the second circular polarization) or (ii) maintain the polarization of incident light 602 (e.g., tunable retarder 508-1 is in a second state to maintain the polarization of incident light 602 so that transmitted light 604 has the same polarization, namely the first circular polarization). For example, tunable retarders are tunable half-wave plates. In FIG. 6A, the first circular polarization is depicted as right-handed circular polarization and the second circular polarization is depicted as left-handed circular polarization. However, in some configurations, the first circular polarization may be left-handed circular polarization and the second circular polarization may be right-handed circular polarization.

In FIG. 6A, polarization selective optical element 410-1 is a reflective grating (e.g., a reflective polarization volume hologram grating) configured to redirect light having the first circular polarization (e.g., light 604) without changing its polarization (e.g., light 606 has the first circular polarization). The polarization selective optical element 410-1 is further configured to transmit light having the second circular polarization without changing its polarization (e.g., light 608 is transmitted through polarization selective optical element 410-1). The transmitted light may undergo total internal reflection and continue to propagate within the optical system 4008-B. Redirected light 606 is received by spatial light modulator (SLM) 406. SLM 406 modulates of the received light to output image light 612. For example, SLM 406 modulates an intensity and/or phase of the received light. Light 612, or at least a portion of light 612, has the second circular polarization and the at least a portion of the light 612 is transmitted through polarization selective optical element 410-1 to exit optical system 400-B. Although FIG. 6A illustrates that polarization selective optical element 410-1 redirects light having the first circular polarization and transmits light having the second circular polarization, polarization selective optical element 410-1 may transmit light having the first circular polarization and redirect light having the second circular polarization.

In some cases, the respective tunable retarder changes a polarization of incident light so that the transmitted light has components having different polarizations (e.g., tunable retarder 508-3 is in a state to change the polarization of incident light 602 so that transmitted light 610 includes a first portion 610-1 having the first circular polarization and a second portion 610-2 has a second circular polarization). The first portion 610-1 having the first circular polarization is redirected by polarization selective optical element 410-1 toward SLM 406, which, in turn, provides image light 614, and the second portion 610-2 having the second circular polarization is transmitted through polarization selective optical element 410-1.

FIG. 6B is similar to FIG. 6A but differs from FIG. 6A at least in that incident light 602 has a linear polarization. Array of tunable retarders 408-B is configured to, depending on the state of the respective tunable retarder, either change the first linear polarization to a second linear polarization that is orthogonal to the first linear polarization (e.g., tunable retarder 508-1 is in a first state to change the polarization of incident light 602 so that transmitted light 604 has the second linear polarization) or maintain the polarization of incident light 602 (e.g., tunable retarder 508-2 is in a second state to maintain the polarization of incident light 602 so that transmitted light 608 has the first linear polarization). For example, tunable retarders are tunable half-wave plates. In FIG. 6B, the first linear polarization is depicted as s-polarization and the second linear polarization is depicted as p-polarization. However, the first linear polarization may be p-polarization and the second linear polarization may be s-polarization.

In some cases, the respective tunable retarder changes a polarization of incident light so that the transmitted light has components having different polarizations (e.g., tunable retarder 508-3 is in a third state to change the polarization of incident light 602 so that transmitted light 610 includes a first portion 610-1 having the second linear polarization and a second portion 610-2 having the first linear polarization).

In FIG. 6B, polarization selective optical element 410-2 is a reflective polarizer oriented to redirect light having the second linear polarization (e.g., light 604) without changing its polarization (e.g., light 605 has the second linear polarization after being reflected by polarization selective optical element 410-2) and transmit light having the first linear polarization without changing its polarization (e.g., light 608 is transmitted through polarization selective optical element 410-2). Light 605 redirected by polarization selective optical element 410-2 is transmitted through array of tunable retarders 408-B so that transmitted light 606 has the first linear polarization. SLM 406 receives light 606 and modulates of the received light to output image light 612 so that light 612, or at least a portion of light 612, has the second linear polarization. The portion of light 612 is transmitted through tunable retarder 408-B as light 613 having the first polarization. At least a portion of the light 613 is transmitted through polarization selective optical element 410-2 to exit optical system 400-B. Similarly, when a tunable retarder (e.g., tunable retarder 508-3 in the third state) provides light with the first portion 610-1 having the second linear polarization and the second portion 610-2 having the first linear polarization, polarization selective optical element 410-2 transmits the second portion 610-2 having the first polarization and redirects the first portion 610-1 having the second linear polarization toward SLM 406 so that SLM 406 return image light 614.

FIG. 6C is similar to FIG. 6B but differs from FIG. 6B at least in that array of tunable retarders 408-3 is configured to, depending on the state of the respective tunable retarder, either change the first linear polarization to the first circular polarization (e.g., tunable retarder 508-1 is in a state to change the polarization of incident light 602 so that transmitted light 604 has the first circular polarization) or maintain the polarization of incident light 602 (e.g., tunable retarder 508-2 is in a state to maintain the polarization of incident light 602 so that transmitted light 608 has the first linear polarization). For example, tunable retarders are switchable quarter-wave plates.

In some embodiments, optical system 400-B includes additional one or more retarder plates (e.g., one or more of a quarter-wave plate and/or a half-wave plate) for modifying polarization of light propagating inside waveguide 404 (e.g., as shown by lights 422-1, 428-1, and 430-1 in FIG. 4D). In some embodiments, an additional retarder plate (e.g., a quarter-wave plate) is positioned between SLM 406 and waveguide 404 so that light 606 having the first linear polarization is reflected as light 612 having the second linear polarization in FIG. 6C. Alternatively, SLM 406 modulates a phase of the light such that light 606 having the first linear polarization is reflected as light 612 having the second linear polarization. In some embodiments, an additional retarder plate (e.g., a half-wave plate) may be positioned between polarization selective optical element 410-1 and substrate 412 shown in FIG. 6A.

Figure 7A:
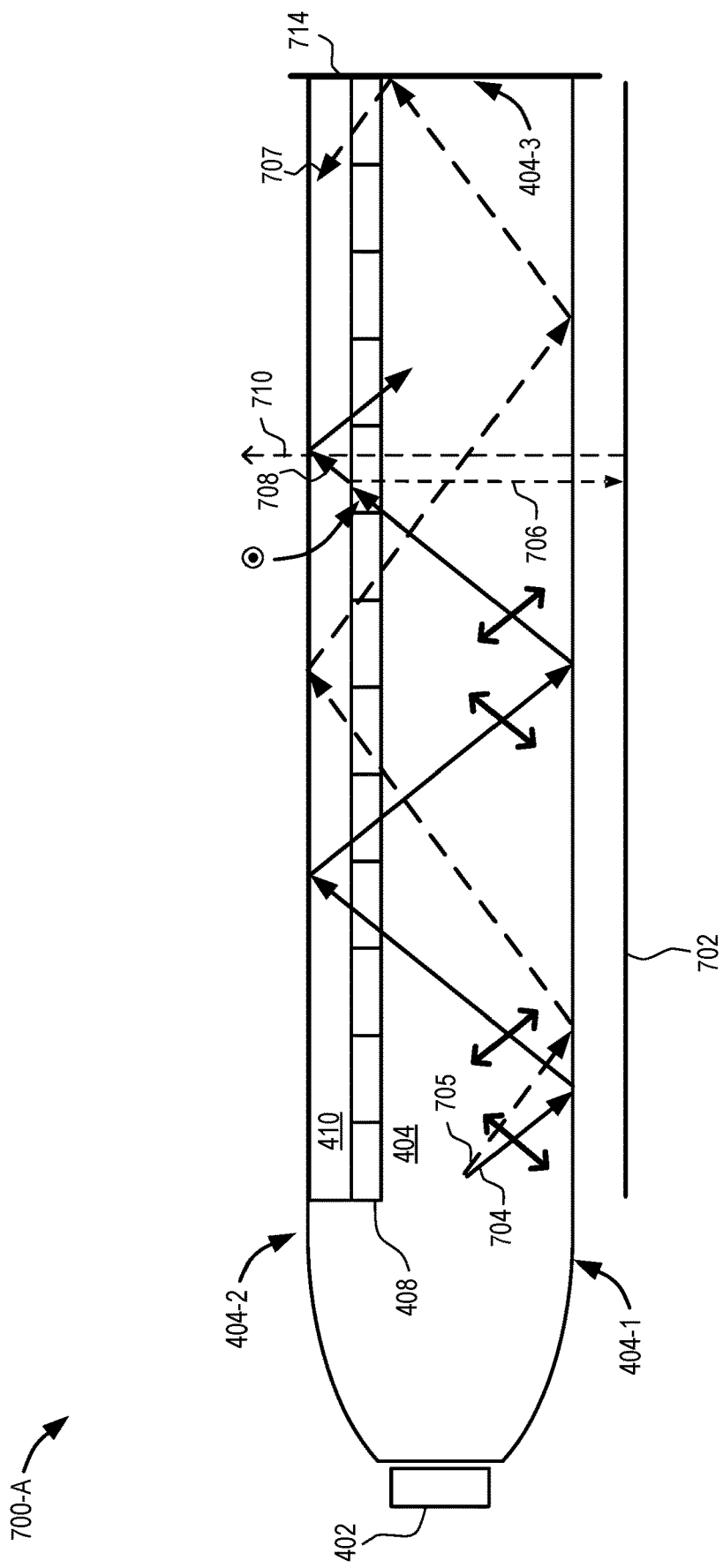
FIG. 7A is a schematic diagram illustrating a display device, in accordance with some embodiments.

FIG. 7A is a schematic diagram illustrating display device 700-A, in accordance with some embodiments. Display device 700-A includes waveguide 404, the array of tunable retarders 408, and polarization selective optical element 410 (e.g., a reflective polarization selective optical element). Display device 700-A is configured to operate as a display, instead of an illuminator for a separate SLM (e.g., SLM 406 in FIG. 4A).

In FIG. 7A, array of tunable retarders 408 is configured to receive light (e.g., light 704 and 705) output by light source 402. One or more individual tunable retarders of array of tunable retarders 408 are activated and/or deactivated to modify the polarization of the transmitted light at selected locations. Polarization selective optical element 410 (e.g., a reflective polarization selective grating) receives the transmitted light and, based on a polarization of the transmitted light, either redirects the transmitted light toward reflector 702 (e.g., as light 706) or allows the transmitted light to continue propagation along waveguide 404 (e.g., as light 708) via total internal reflections. Thus, display device 700-A may provide image light corresponding to one or more portions of array of tunable retarders 408, without using a separate spatial light modulator.

In some embodiments, display device 700-A includes reflector 702. Reflector 702 receives light 706 and reflects it back as light 710, which exits from display device 700-A after passing through array of tunable retarders 408, polarization selective optical element 410, and optionally polarizer 405 (e.g., as described with respect to FIG. 4A).

In some embodiments, display device 700-A includes one or more reflectors 714 (e.g., a mirror). As shown in FIG. 7A, reflector 714 is disposed adjacent to side surface 404-3 of waveguide 404 (e.g., adjacent to one terminal end of waveguide 404). Side surface 404-3 is perpendicular to and adjoining surfaces 404-1 and 404-2. This allows recirculation of light, which includes reflection of light approaching one end of waveguide 404 by reflector 714 back toward waveguide 404. For example, light 705 propagating inside waveguide 404 is recirculated back from reflector 714 as light 707, so that light 707 continues to propagate inside waveguide 404. In some embodiments, display device 700-A includes reflectors 714 on two or more side surfaces (e.g., surfaces perpendicular to surfaces 404-1 and 404-2) of waveguide 404. In some embodiments, display device 700-A includes reflectors 714 on all side surfaces (e.g., surfaces perpendicular to surfaces 404-1 and 404-2) of waveguide 404 (except for a portion of a side surface for coupling light from light source 402).

Figure 7B:
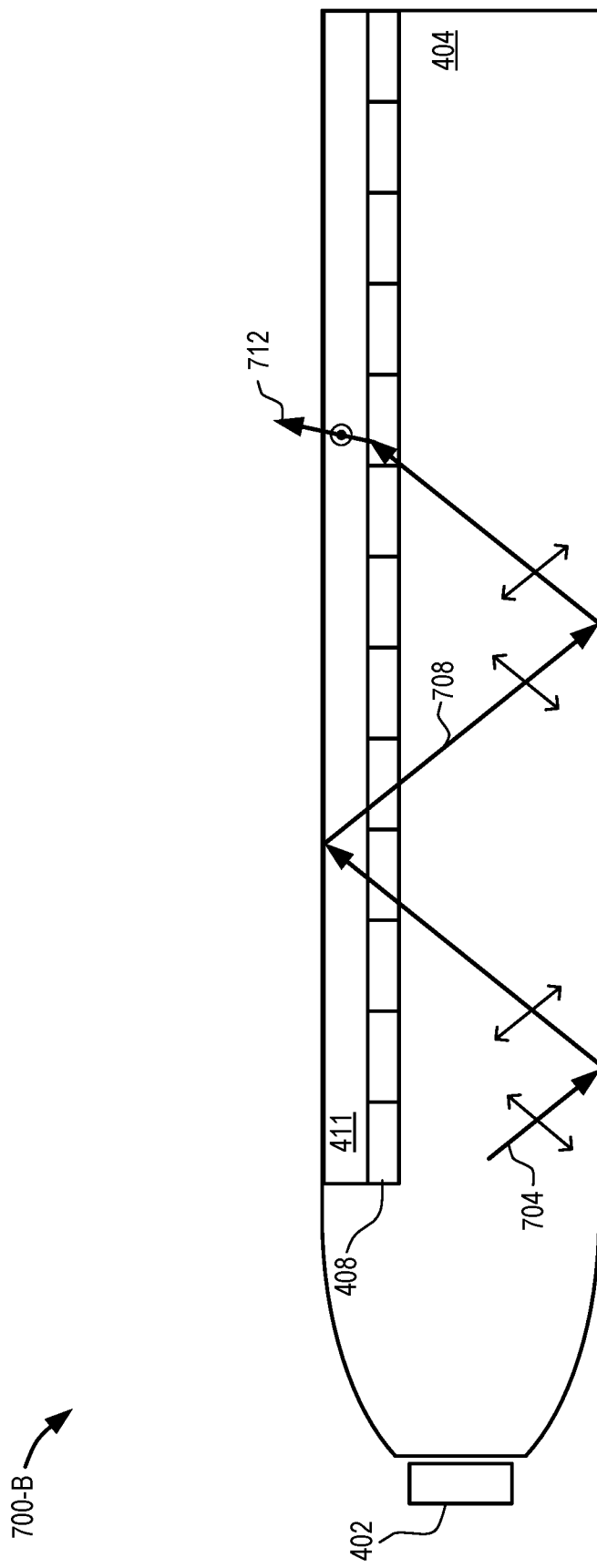
FIG. 7B is a schematic diagram illustrating a display device, in accordance with some embodiments.

FIG. 7B is a schematic diagram illustrating display device 700-B, in accordance with some embodiments. Display device 700-B is similar to display device 700-A in FIG. 7A, except that polarization selective optical element 411 is a transmissive polarization selective optical element (e.g., a polarization selective transmission grating). In FIG. 7B, polarization selective optical element 411 receives the light transmitted through the array of tunable retarders 408 and, based on a polarization of the transmitted light, either steers the transmitted light to exit waveguide 404 (e.g., light 712), or allows the transmitted light to continue propagation along waveguide 404 via total internal reflection.

FIG. 8A-8D are schematic diagrams illustrating polarization volume hologram (PVH) grating 800 in accordance with some embodiments. In some embodiments, PVH grating 800 corresponds to polarization selective optical element 410 described with respect to FIG. 4A. FIG. 8A illustrates a three dimensional view of PVH grating 800 with incoming light 804 entering the lens along the z-axis. FIG. 8B illustrates an x-y-plane view of PVH grating 800 with a plurality of liquid crystals (e.g., liquid crystals 802-1 and 802-2) with various orientations. The orientations (e.g., represented by azimuthal angles θ) of the liquid crystals are constant along reference line AA' along the x-axis, as shown in FIG. 8D illustrating a detailed plane view of the liquid crystals along the reference line. The orientations of the liquid crystals in FIG. 8B vary along the y-axis. The pitch defined as a distance along the y-axis at which the azimuth angle of a liquid crystal has rotated 180 degrees is constant throughout the grating. FIG. 8C illustrates a y-z-cross-sectional view of PVH grating 800. PVH grating 800 has helical structures 808 with helical axes aligned corresponding to the x-axis. The helical structures create a volume grating with a plurality of diffraction planes (e.g., planes 810-1 and 810-2) extending across the grating. In FIG. 8C, diffraction planes 810-1 and 810-2 are tilted with respect to the z-axis. Helical structures 808 define the polarization selectivity of PVH grating 800, as light with circular polarization handedness corresponding to the helical axes is diffracted while light with circular polarization with the opposite handedness is not diffracted. Helical structures 808 also define the wavelength selectivity of PVH grating 800, as light with wavelength close to a helical pitch (e.g., helical pitch 812 in FIG. 8C) is diffracted while light with other wavelengths is not diffracted. In some embodiments, PVH grating 800 is a reflective grating (e.g., polarization selective optical element 410 described with respect to FIGS. 4A and 7A). In some embodiments, PVH grating 800 is a transmission grating (e.g., polarization selective optical element 411 described with respect to FIG. 7B).

In light of these principles, we now turn to certain embodiments.

In accordance with some embodiments, an optical device for illuminating one or more portions of a spatial light modulator (SLM) includes a waveguide, an array of tunable retarders and a polarization selective optical element. For example, optical device 400-A shown in FIG. 4A includes the array of tunable retarders 408 (e.g., including tunable retarders 408-1 and 408-2) and polarization selective optical element 410. In some embodiments, optical device 400-A is configured to selectively illuminate one or more portions of SLM 406, which is a reflective SLM.

The array of tunable retarders is positioned relative to the waveguide so that a respective tunable retarder of the array of tunable retarders receives light from the waveguide (e.g., light 422-2 in FIG. 4D). The respective tunable retarder has a first state, which causes the respective tunable retarder (e.g., a tunable retarder 408-1 in FIG. 4D in the first state) to direct light having a first polarization in a first direction, and a second state, distinct from the first state, which causes the respective tunable retarder (e.g., a tunable retarder 408-1 in FIG. 4D in the second state) to direct light having a second polarization in the first direction (e.g., the respective tunable retarder changes the polarization of the transmitted light to the first polarization while the respective tunable retarder is in the first state and to the second polarization while the respective tunable retarder is in the second state). The second polarization is distinct from the first polarization. In some embodiments, the respective tunable retarder, while in the first state, forgoes converting the polarization of the received light to the second polarization. In some embodiments, the respective tunable retarder, while in the second state, forgoes converting the polarization of the received light to the first polarization. Directing the light may or may not involve changing direction of the transmitted light. For example, the light propagates in the first direction, passes through the respective tunable retarder, and exits the respective tunable retarder in the first direction so that the direction of the light is maintained after passing through the respective tunable retarder.

The polarization selective optical element is located adjacent to the array of tunable retarders so that the light having the first polarization propagates from the polarization selective optical element in a second direction (e.g., light 424-1 in FIG. 4D) and the light having the second polarization propagates from the polarization selective optical element in a third direction distinct from the second direction (e.g., light 422-3 in FIG. 4D). In some embodiments, the polarization selective optical element forgoes directing the light having the first polarization in the third direction. In some embodiments, the polarization selective optical element forgoes directing the light having the second polarization in the second direction. In some embodiments, the second direction is identical to the first direction. In some embodiments, the second direction is distinct from the first direction. In some embodiments, the third direction is identical to the first direction. In some embodiments, the third direction is distinct from the first direction.

In some embodiments, the waveguide has a first surface and an opposing second surface (e.g., surfaces 404-1 and 404-2 in FIG. 4A), and the light propagating in the second direction from the polarization selective optical element exits the waveguide through the first surface (e.g., light 424-1 in FIG. 4D).

In some embodiments, the light propagating in the third direction from the polarization selective optical element undergoes a total internal reflection at the second surface of the waveguide thereby continuing to propagate inside the waveguide (e.g., lights 422-3 and 422-4 in FIG. 4D).

In some embodiments, the array of tunable retarders is located adjacent to the second surface of the waveguide (e.g., FIG. 4A). In some embodiments, the array of tunable retarders is in contact with the second surface of the waveguide.

In some embodiments, the polarization selective optical element and the array of tunable retarders are embedded inside the waveguide (e.g., FIG. 4C). In some embodiments, the polarization selective optical element and the array of tunable retarders are disposed between the first surface and the second surface of the waveguide. In some embodiments, the polarization selective optical element and the array of tunable retarders are not in contact with the first surface and/or the second surface of the waveguide.

In some embodiments, the optical device includes a transparent substrate (e.g., substrate 412 in FIG. 4B). The polarization selective optical element is disposed between, and is in direct contact with, the substrate and the array of tunable retarders. The array of tunable retarders is positioned adjacent to the second surface of the waveguide. The light propagating in the third direction from the polarization selective optical element is received by the transparent substrate such that the light undergoes a total internal reflection at a surface of the transparent substrate (e.g., lights 422-3 and 422-4 in FIG. 4D).

In some embodiments, the light exiting the waveguide through the first surface is received by a respective portion of the one or more portions of the spatial light modulator thereby illuminating the respective portion of the one or more portions of the spatial light modulator (e.g., FIG. 4D illustrates lights 424-1, 424-2, 428-2, and 430-2 that illuminate different regions of SLM 406).

In some embodiments, the array of tunable retarders includes a first tunable retarder and a second tunable retarder distinct and mutually exclusive from the first tunable retarder (e.g., tunable retarders 408-1 and 408-4 in FIG. 4D). The first tunable retarder is tunable independent of the state the second tunable retarder is in and the second tunable retarder is tunable independent of the state the first tunable retarder is in. For example, FIG. 5 illustrates tunable retarders 408-1, 508-2, and 508-3 in different states. In some embodiments, the second tunable retarder is positioned away from the first tunable retarder by a distance (e.g., FIG. 4D).

In some embodiments, the first tunable retarder is configured to, in response to receiving, while the first tunable retarder is in the first state, the light having a third polarization (e.g., light 602 in FIG. 6A), provide first light having the first polarization (e.g., light 604) and in response to receiving, while the first tunable retarder is in the second state, the light having the third polarization, provide second light having the second polarization (e.g., light 608). The second tunable retarder is configured to, in response to receiving, while the second tunable retarder is in the first state, the light having the third polarization, provide the first light having the first polarization and in response to receiving, while the second tunable retarder is in the second state, the light having the third polarization, provide the second light having the second polarization.

In some embodiments, the respective tunable retarder is configured to change states between multiple distinct states, including the first state and the second state (e.g., FIGS. 5 and 6A-6C). In some embodiments, while in the first state, the respective tunable retarder changes polarization of the light such that the first polarization is orthogonal to the third polarization, and while in the second state, the respective tunable retarder transmits the light such that the second polarization corresponds to the third polarization. In some embodiments, the multiple distinct states include a third state and, while in the third state, the respective tunable retarder changes polarization to a fourth polarization that is distinct from the first, second, and third polarizations (e.g., each of the first, second and third polarizations is either horizontal polarization or vertical polarization, and the fourth polarization is a diagonal polarization). In some embodiments, the multiple distinct states include a fourth state and in the fourth state, the respective tunable retarder changes polarization of a first portion of the light without changing polarization of a second portion of the light.

In some embodiments, the array of tunable retarders includes a third tunable retarder distinct and mutually exclusive from the first tunable retarder and the second tunable retarder (e.g., tunable retarder 408-7 in FIG. 4D). The second light from the second tunable retarder, propagating inside the waveguide, is received by the third tunable retarder (e.g., light 424-2). The second light received by the third tunable retarder has the second polarization. The third tunable retarder is configured to, while the third tunable retarder is in the first state, provide the first light having the first polarization and, while the third tunable retarder is in the second state, provide the second light having the second polarization.

In some embodiments, the first light propagating from the first tunable retarder is received by a first portion of the spatial light modulator and the second light propagating from the third tunable retarder is received by a second portion distinct from the first portion of the spatial light modulator (e.g., the first portion and the second portion are mutually exclusive).

In some embodiments, the first light propagating from the first tunable retarder received by the first portion of the spatial light modulator has a first intensity and the second light propagating from the third tunable retarder received by the second portion of the spatial light modulator has a second intensity distinct from the first intensity (e.g., light 424-1 and 424-2 has distinct intensities in FIG. 4D).

In accordance with some embodiments, a display device includes a spatial light modulator and an optical device configured to illuminate the spatial light modulator (e.g., SLM 406 and optical device 400-A in FIG. 4A). The optical device for illuminating one or more portions of a spatial light modulator includes a waveguide, an array of tunable retarders and a polarization selective optical element. A respective tunable retarder of the array of tunable retarders is positioned relative to the waveguide so that a respective tunable retarder is optically coupled to receive light from the waveguide. The respective tunable retarder has a first state, which causes the respective tunable retarder to direct light having a first polarization in a first direction, and a second state distinct from the first state, which causes the respective tunable retarder to direct light having a second polarization in the first direction. The second polarization is distinct from the first polarization. The polarization selective optical element is located adjacent to the array of tunable retarders so that the light having the first polarization propagates from the polarization selective optical element in a second direction and the light having the second polarization propagates from the polarization selective optical element in a third direction distinct from the second direction.

In some embodiments, the spatial light modulator is configured to receive the light propagating in the second direction from the polarization selective optical element (e.g., light 424-1 in FIG. 4A) and output image light in a fourth direction (e.g., light 426-1).

In accordance with some embodiments, a method for illuminating one or more portions of a spatial light modulator is performed at an optical device including a waveguide, an array of tunable retarders, and a polarization selective optical element located adjacent to the array of tunable retarders (e.g., FIG. 4A). The method includes receiving light by a respective tunable retarder from the waveguide. The method includes providing, by the respective tunable retarder, while in a first state, light having a first polarization and providing, by the respective tunable retarder, while in a second state, light having a second polarization. For example, when the light received by the respective tunable retarder passes through the respective tunable retarder, the polarization of the light changes to the first polarization when the respective tunable is in the first state and to the second polarization when the respective tunable retarder is in the second state. The method further includes directing, with the polarization selective optical element, the light having the first polarization in a first direction toward a respective portion of the one or more portions of the spatial light modulator and directing, with the polarization selective optical element, the light having the second polarization in a second direction distinct from the first direction. The respective tunable retarder is tunable between different states, including the first state and the second state.

In some embodiments, the array of tunable retarders includes a first tunable retarder and a second tunable retarder distinct and mutually exclusive from the first tunable retarder (e.g., FIG. 4D). The first tunable retarder is tunable independent of the state the second tunable retarder is in and the second tunable retarder is tunable independent of the state the first tunable retarder is in. In some embodiments, the second tunable retarder is separate from the first tunable retarder.

In some embodiments, the method further includes receiving, with the first tunable retarder while the first tunable retarder is in the first state, the light having a third polarization and providing first light having the first polarization (e.g., the first tunable retarder changes the polarization of the transmitted light from the third polarization to the first polarization while the first tunable retarder is in the first state). The method also includes receiving, with the first tunable retarder while the first tunable retarder is in the second state, the light having the third polarization and providing second light having the second polarization (e.g., the first tunable retarder changes the polarization of the transmitted light from the third polarization to the second polarization while the first tunable retarder is in the second state). The method further includes receiving, with the second tunable retarder while the second tunable retarder is in the first state, the light having the third polarization and providing the first light having the first polarization (e.g., the second tunable retarder changes the polarization of the transmitted light from the third polarization to the first polarization while the second tunable retarder is in the first state) and receiving, with the second tunable retarder while the second tunable retarder is in the second state, the light having the third polarization and providing the second light having the second polarization (e.g., the second tunable retarder changes the polarization of the transmitted light from the third polarization to the second polarization while the second tunable retarder is in the second state).

In some embodiments, the array of tunable retarders includes a third tunable retarder distinct and mutually exclusive from the first tunable retarder and the second tunable retarder. The light from the second tunable retarder, propagating inside the waveguide, is received by the third tunable retarder. In some embodiments, the light received by the third tunable retarder has the second polarization. The third tunable retarder is configured to, while the third tunable retarder is in the first state, provide the light having the first polarization and while the third tunable retarder is in the second state, provide the light having the second polarization (e.g., the third tunable retarder changes the polarization of the transmitted light from the second polarization to the first polarization while the third tunable retarder is in the first state and the third tunable retarder transmits the light having the second polarization without changing its polarization while the third tunable retarder is in the second state).

In some embodiments, the method further includes receiving, by a first portion of the spatial light modulator, the first light propagating from the first tunable retarder and receiving, by a second portion distinct from the first portion of the spatial light modulator, the second light propagating from the third tunable retarder.

In accordance with some embodiments, a display device (e.g., display device 700-A in FIG. 7) includes a waveguide (e.g., waveguide 404), an array of tunable retarders (e.g., the array of tunable retarders 408) and a polarization selective optical element. In some embodiments, the polarization selective optical element is a polarization selective reflective grating (e.g., polarization selective reflective grating 410 in FIG. 7A) or a polarization selective transmission grating (e.g., polarization selective transmission grating 411 in FIG. 7B). In some embodiments, the array of tunable retarders is embedded inside the waveguide. A respective tunable retarder receives light from the waveguide (e.g., light 704). The respective tunable retarder has a first state, which causes the respective tunable retarder to direct light having a first polarization in a first direction, and a second state distinct from the first state, which causes the respective tunable retarder to direct light having a second polarization that is distinct from the first polarization in the first direction. Directing the light may or may not involve changing direction of the transmitted light. For example, the light having the first polarization may pass through the respective tunable retarder without changing its direction. The polarization selective optical element is located adjacent to the array of tunable retarders so that the light having the first polarization propagates from the polarization selective optical element in a second direction (e.g., light 706 in FIG. 7A or light 712 in FIG. 7B) and the light having the second polarization propagates from the polarization selective optical element in a third direction distinct from the second direction (e.g., light 708).

In some embodiments, the light received by the respective tunable retarder has a third polarization. In some embodiments, the third polarization and the second polarization are identical. In some embodiments, the second polarization is distinct from the third polarization. In some embodiments, the second polarization is orthogonal to the first polarization.

In some embodiments, the light having the first polarization is reflected by the polarization selective optical element in the second direction (e.g., light 706 in FIG. 7A).

In some embodiments, the display device also includes a first reflector (e.g., reflector 702 such as a mirror in FIG. 7A) positioned relative to the waveguide so that the first reflector receives the light (e.g., light 706) having the first polarization in the second direction and reflects the received light in a fourth direction (e.g., light 710) distinct from the second direction.

In some embodiments, the light reflected by the first reflector in the fourth direction (e.g., light 710 in FIG. 7A) is transmitted through the waveguide, the array of tunable retarders, and the polarization selective optical element.

In some embodiments, the light having the first polarization is transmitted by the polarization selective optical element (e.g., light 712 diffracted by the polarization selective transmission grating as shown in FIG. 7B).

In some embodiments, the light propagating in the third direction from the polarization selective optical element undergoes a total internal reflection at a first surface of the waveguide thereby continuing to propagate inside the waveguide (e.g., light 708 in FIG. 7A).

In some embodiments, including a second reflector (e.g., reflector 714) positioned adjacent to an end of the waveguide. In some embodiments, the second reflector is positioned perpendicularly to the waveguide. In some embodiments, the second reflector is positioned at an angle to the waveguide. The second reflector is configured to receive and reflect light propagating inside the waveguide for recirculation (e.g., light 705 is reflected as light 707).

In some embodiments, the light propagating from the polarization selective optical element in the second direction is configured for rendering one or more images (e.g., light 706 in FIG. 7A or light 712 in FIG. 7B has a spatial intensity and/or phase distribution to convey image information).

In some embodiments, the array of tunable retarders or the polarization selective optical element is located adjacent to a first surface of the waveguide (e.g., surface 404-2 in FIG. 7A).

In some embodiments, the polarization selective optical element and the array of tunable retarders are embedded inside the waveguide (e.g., FIG. 4C).

In some embodiments, the respective tunable retarder is configured to change states selected from multiple distinct states, including the first state and the second state (e.g., FIG. 5).

In some embodiments, the display device further includes an illumination source optically coupled with the waveguide (e.g., illumination source 402 in FIG. 7A). The illumination source is configured to provide light having a third polarization to the respective tunable retarder.

In some embodiments, the array of tunable retarders includes a first tunable retarder and a second tunable retarder distinct and mutually exclusive from the first tunable retarder (e.g., tunable retarders 408-1 and 408-2 in FIG. 4A). The first tunable retarder is tunable independent of the state the second tunable retarder is in. The second tunable retarder is tunable independent of the state the first tunable retarder is in.

In some embodiments, the first tunable retarder is configured to, in response to receiving, while the first tunable retarder is in the first state, the light having a third polarization, provide the light having the first polarization and in response to receiving, while the first tunable retarder is in the second state, the light having the third polarization, provide the light having the second polarization. The second tunable retarder is configured to, in response to receiving, while the second tunable retarder is in the first state, the light having the third polarization, provide the light having the first polarization, and in response to receiving, while the second tunable retarder is in the second state, the light having the third polarization, provide the light having the second polarization.

In some embodiments, the array of tunable retarders includes a third tunable retarder distinct and mutually exclusive from the first tunable retarder and the second tunable retarder. The light from the second tunable retarder, propagating inside the waveguide, is received by the third tunable retarder. In some embodiments, the light received by the third tunable retarder has the second polarization. The third tunable retarder is configured to, while the third tunable retarder is in the first state, provide the light having the first polarization (e.g., the third tunable retarder changes the polarization of the transmitted light from the second polarization to the first polarization) and while the third tunable retarder is in the second state, provide the light having the second polarization (e.g., the third tunable retarder forgoes changing the polarization of the transmitted light from the second polarization to the first polarization).

In some embodiments, the polarization selective optical element is a polarization grating (e.g., polarization volume grating PVH grating 800 as shown in FIG. 8A-8D).

In some embodiments, the light propagating from the first tunable retarder has a first intensity and the light propagating from the third tunable retarder has a second intensity distinct from the first intensity.

In accordance with some embodiments, a method is performed at a display device including a waveguide, an array of tunable retarders and a polarization selective optical element located adjacent to the array of tunable retarders (e.g., FIG. 7A). The method includes receiving, by a respective tunable retarder, light from the waveguide. The method includes providing, by the respective tunable retarder, while in a first state, light having a first polarization in a first direction and providing, by the respective tunable retarder, while in a second state, light having a second polarization in the first direction. For example, when the light received by the respective tunable retarder passes through the respective tunable retarder, the polarization of the light changes to the first polarization when the respective tunable is in the first state and to the second polarization when the respective tunable retarder is in the second state. The method also includes directing, with the polarization selective optical element, the light having the first polarization in a second direction and the light having the second polarization in a third direction distinct from the first direction.

In some embodiments, the method further includes receiving, with a first reflector (e.g., FIG. 7A), the light having the first polarization in the second direction and reflecting, with the first reflector, the light in a fourth direction distinct from the second direction.

In some embodiments, directing, with the polarization selective optical element, the light having the first polarization in the first direction includes reflecting the light having the first polarization (e.g., FIG. 7A).

In some embodiments, directing, with the polarization selective optical element, the light having the second polarization in the second direction includes transmitting the light having the second polarization so that the third direction corresponds to the first direction (e.g., FIG. 7B).

Although various drawings illustrate operations of particular components or particular groups of components with respect to one eye, a person having ordinary skill in the art would understand that analogous operations can be performed with respect to the other eye or both eyes. For brevity, such details are not repeated herein.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A display device, comprising:
a waveguide;
an array of tunable retarders in contact with the waveguide so that a respective tunable retarder:
has a first state, which causes the respective tunable retarder to direct light, received from the waveguide, having a first polarization in a first direction, and
has a second state distinct from the first state, which causes the respective tunable retarder to direct light, received from the waveguide, having a second polarization that is distinct from the first polarization in the first direction; and
a polarization selective optical element located adjacent to the array of tunable retarders so that the light having the first polarization propagates from the polarization selective optical element in a second direction and the light having the second polarization propagates from the polarization selective optical element in a third direction distinct from the second direction.

2. The display device of claim 1, further including a first reflector positioned relative to the waveguide so that the first reflector receives the light having the first polarization in the second direction and reflects the light in a fourth direction distinct from the second direction.

3. The display device of claim 2, wherein the light reflected by the first reflector in the fourth direction is transmitted through the waveguide, the array of tunable retarders, and the polarization selective optical element.

4. The display device of claim 1, wherein the light having the first polarization is reflected by the polarization selective optical element in the second direction.

5. The display device of claim 1, wherein the light having the first polarization is transmitted by the polarization selective optical element.

6. The display device of claim 1, wherein the light propagating in the third direction from the polarization selective optical element undergoes a total internal reflection thereby continuing to propagate inside the waveguide.

7. The display device of claim 1, further including a second reflector positioned adjacent to an end of the waveguide and perpendicular to the waveguide.

8. The display device of claim 1, wherein the light propagating from the polarization selective optical element in the second direction is configured for rendering one or more images.

9. The display device of claim 1, wherein the array of tunable retarders or the polarization selective optical element is located adjacent to a first surface of the waveguide.

10. The display device of claim 1, wherein the polarization selective optical element and the array of tunable retarders are embedded inside the waveguide.

11. The display device of claim 1, wherein the respective tunable retarder is configured to change states selected from multiple distinct states, including the first state and the second state.

12. The display device of claim 1, further including an illumination source optically coupled with the waveguide, the illumination source configured to provide light having a third polarization to the respective tunable retarder.

13. The display device of claim 1, wherein:
the array of tunable retarders includes a first tunable retarder and a second tunable retarder distinct and mutually exclusive from the first tunable retarder;
the first tunable retarder is tunable independent of the state the second tunable retarder is in; and
the second tunable retarder is tunable independent of the state the first tunable retarder is in.

14. The display device of claim 13, wherein:
the first tunable retarder is configured to:
receive, while the first tunable retarder is in the first state, the light having a third polarization and provide the light having the first polarization; and
receive, while the first tunable retarder is in the second state, the light having the third polarization and provide the light having the second polarization; and
the second tunable retarder is configured to:
receive, while the second tunable retarder is in the first state, the light having the third polarization and provide the light having the first polarization; and
receive, while the second tunable retarder is in the second state, the light having the third polarization and provide the light having the second polarization.

15. The display device of claim 14, wherein:
the array of tunable retarders includes a third tunable retarder distinct and mutually exclusive from the first tunable retarder and the second tunable retarder;
the light from the second tunable retarder, propagating inside the waveguide, is received by the third tunable retarder, the light received by the third tunable retarder having the second polarization; and
the third tunable retarder is configured to:
while the third tunable retarder is in the first state, provide the light having the first polarization; and
while the third tunable retarder is in the second state, provide the light having the second polarization.

16. The display device of claim 1, wherein the polarization selective optical element is a polarization grating.

17. A method, comprising:
at a display device including a waveguide, an array of tunable retarders and a polarization selective optical element located adjacent to the array of tunable retarders:
receiving, by a respective tunable retarder, light from the waveguide;
providing, by the respective tunable retarder, while in a first state, light having a first polarization in a first direction;
providing, by the respective tunable retarder, while in a second state, light having a second polarization in the first direction;
directing, with the polarization selective optical element, the light having the first polarization in a second direction; and
directing, with the polarization selective optical element, the light having the second polarization in a third direction distinct from the first direction.

18. The method of claim 17, further comprising:
receiving, with a first reflector, the light having the first polarization in the second direction; and
reflecting, with the first reflector, the light in a fourth direction distinct from the second direction.

19. The method of claim 17, wherein:
directing, with the polarization selective optical element, the light having the first polarization in the first direction includes reflecting the light having the first polarization.

20. The method of claim 17, wherein
directing, with the polarization selective optical element, the light having the second polarization in the second direction includes transmitting the light having the second polarization so that the third direction corresponds to the first direction.

* * * * *